(12) United States Patent
Harper

(10) Patent No.: US 11,784,888 B2
(45) Date of Patent: *Oct. 10, 2023

(54) FREQUENCY-BASED SORTING ALGORITHM FOR FEATURE SPARSE NLP DATASETS

(71) Applicant: Moogsoft Inc., San Francisco, CA (US)

(72) Inventor: Robert Duncan Harper, London (GB)

(73) Assignee: Moogsoft Inc., San Francisco, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 17/133,914

(22) Filed: Dec. 24, 2020

(65) Prior Publication Data

US 2021/0258225 A1 Aug. 19, 2021

Related U.S. Application Data

(63) Continuation-in-part of application No. 16/902,344, filed on Jun. 16, 2020, now Pat. No. 11,303,502.

(60) Provisional application No. 62/953,554, filed on Dec. 25, 2019.

(51) Int. Cl.
*G06F 3/048* (2013.01)
*H04L 41/12* (2022.01)
*G06F 17/16* (2006.01)
*H04L 41/14* (2022.01)
*G06F 18/23213* (2023.01)

(52) U.S. Cl.
CPC .............. *H04L 41/12* (2013.01); *G06F 17/16* (2013.01); *G06F 18/23213* (2023.01); *H04L 41/145* (2013.01)

(58) Field of Classification Search
None
See application file for complete search history.

(56) References Cited

U.S. PATENT DOCUMENTS

| | | | |
|---|---|---|---|
| 2002/0107958 A1 | 8/2002 | Faraldo, II | |
| 2003/0110181 A1* | 6/2003 | Schuetze | G06F 16/358 |
| 2005/0033989 A1 | 2/2005 | Paletta | |
| 2005/0198269 A1* | 9/2005 | Champagne | H04L 63/1425 |
| | | | 709/224 |
| 2005/0209983 A1* | 9/2005 | MacPherson | G06T 11/206 |
| 2006/0064486 A1 | 3/2006 | Baron | |
| 2008/0059474 A1 | 3/2008 | Lim | |
| 2009/0193293 A1 | 7/2009 | Stolfo | |
| 2009/0271685 A1* | 10/2009 | Li | H04L 1/0072 |
| | | | 714/776 |
| 2012/0041575 A1* | 2/2012 | Maeda | G05B 23/024 |
| | | | 700/79 |
| 2012/0109882 A1 | 5/2012 | Bouse | |
| 2012/0185418 A1 | 7/2012 | Capman | |
| 2012/0216243 A1* | 8/2012 | Gill | G06F 21/55 |
| | | | 726/1 |
| 2012/0284790 A1 | 11/2012 | Bhargava | |
| 2013/0007093 A1 | 1/2013 | Knox | |
| 2013/0103817 A1 | 4/2013 | Koponen | |
| 2013/0159502 A1* | 6/2013 | Thompson | G06F 11/0754 |
| | | | 709/224 |
| 2013/0246853 A1 | 9/2013 | Salame | |
| 2013/0268839 A1 | 10/2013 | Lefebvre | |

(Continued)

*Primary Examiner* — Hua Lu
(74) *Attorney, Agent, or Firm* — Paul Davis

(57) ABSTRACT

A managed infrastructure is provided. Systems, and associated methods, use frequency-based sorting logic relative to feature spare NLP datasets.

30 Claims, 33 Drawing Sheets

(56) References Cited

U.S. PATENT DOCUMENTS

| | | | |
|---|---|---|---|
| 2014/0075004 A1 | 3/2014 | Van Dusen | |
| 2014/0172371 A1* | 6/2014 | Zhu | G06Q 10/00 |
| | | | 702/185 |
| 2015/0061863 A1* | 3/2015 | Barfield, Jr. | G08B 21/0446 |
| | | | 340/539.11 |
| 2015/0254513 A1 | 9/2015 | Mansour | |
| 2015/0310085 A1* | 10/2015 | Tee | H04L 12/1895 |
| | | | 707/737 |
| 2017/0163672 A1 | 6/2017 | Cobb | |
| 2018/0048530 A1* | 2/2018 | Nikitaki | H04L 43/087 |
| 2019/0311220 A1* | 10/2019 | Hazard | G06F 18/2148 |
| 2019/0349426 A1* | 11/2019 | Smith | H04L 61/4505 |
| 2020/0134484 A1* | 4/2020 | Hazard | G06N 20/00 |

\* cited by examiner

All Situations

| Tr | ID | Category | Created All | Last Change | Moderator | Status | Description | Process | Service | Scop | Queu | Total | Story |
|---|---|---|---|---|---|---|---|---|---|---|---|---|---|
| bla | 79 | Detected | blah | blah | phil | blah | blah | blah | Website | blah | Queu | blah | 79 |
| bla | 99⇧79 | Detected | blah | blah | phil | blah | blah | blah | Website | blah | Queu | blah | 79 |
| bla | 15 | Detected | blah | blah | phil | blah | blah | blah | Website | blah | Queu | blah | |
| bla | 14 | blah | blah | blah | phil | blah | blah | blah | Website | blah | Queu | blah | |
| bla | 13 | blah | blah | blah | phil | blah | blah | blah | Website | blah | Londo | blah | |
| bla | 33⇧79 | Supercede | blah | blah | phil | blah | blah | blah | Website | blah | Londo | blah | 79 |
| bla | 8 | blah | blah | blah | phil | blah | blah | blah | Website | blah | Londo | blah | |
| bla | 11⇧79 | Supercede | blah | blah | phil | blah | blah | blah | Website | blah | | blah | 79 |
| bla | 10 | blah | blah | blah | phil | blah | blah | blah | Website | blah | | blah | |

All Alerts

| Host | Manage | Active | Superceded | Significance | Type | Count | Severit | Owned | Status | Last Occurence | Description |
|---|---|---|---|---|---|---|---|---|---|---|---|
| host12 | mon | 33 | 23, 22, 20 | Impacting | type | 332 | Warnin | Phil | Assigned | 12:12:12 | This is an |
| host13 | mon44 | 31 | Impacting | type1 | 21 | Warnin | Phil | Assigned | 12:12:12 | This is an alert | |
| host 23 | mon | 12,79 | 4,5 | Impacting | type | 33 | Warnin | Phil | Assigned | 12:12:12 | This is an |
| host 3 | mon | 79 | 2,15,11 | Impacting | type | 110 | Warnin | Phil | Assigned | 12:12:12 | This is an |
| | | | Hidden by default | | | | | | | | |

2 Services Impacted
695 Total Alerts
1,554 Total Events

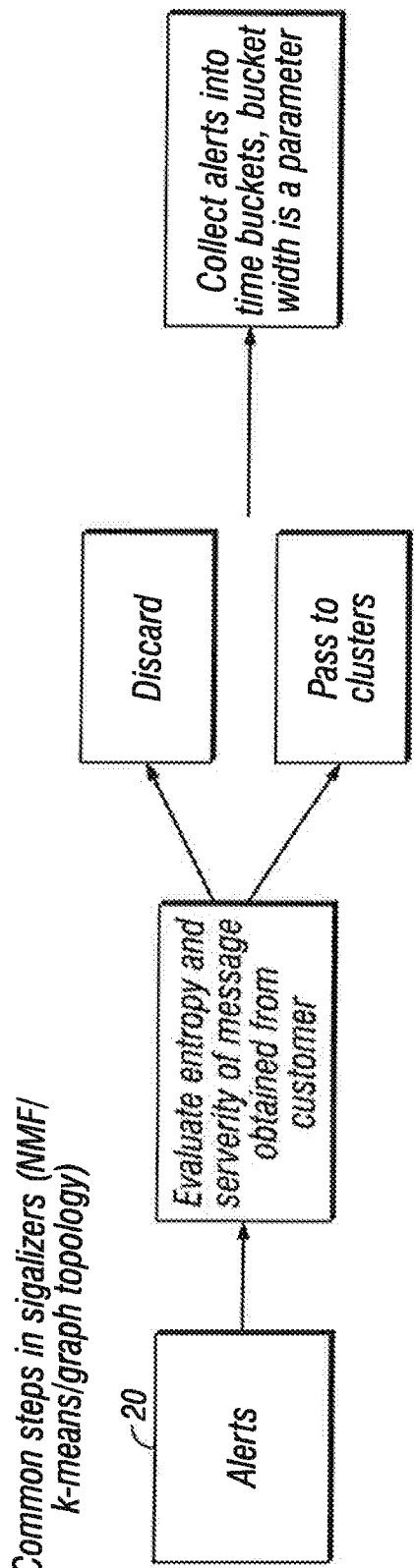
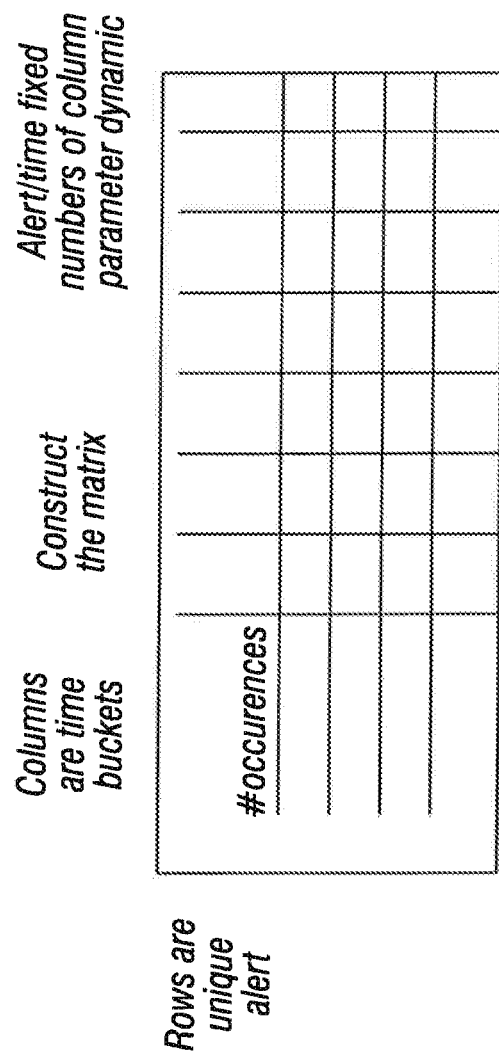
FIG. 4

FIG. 16

Display Query View: ZOK_QN

Query View ID:* ZOK_QN
Description: XC Quality Notification   Quick Info Text:
Table ID:                                 Chart ID: ZOK_XC1
Enable Personalization: X
Private: X                                Owner: KREINDLINA

— 196

Queries

| Query ID | Table View | Description |
|---|---|---|
| ZOK_QN | TABLE_ZOK_QN | standard query generated from ZOK_QN |

— 198

| Input Fields | Output Fields | Layout for Quick View | Subject-Based View Assignments | Chart Views | Authorization |
|---|---|---|---|---|---|

| Query ID | Query Field ID | Description of Query Field | Sequence | Allow Aggr | Sequence | Sorting | Sort Seq. |
|---|---|---|---|---|---|---|---|
| ZOK_QN | CODE_TEXT | Short Text for Code (up to 40 Characters in Length) | 1 | | 1 | - | |
| ZOK_QN | ZDAM_NUM | Number of damages | 2 | | | - | |
| ZOK_QN | D_CAT_TYP | Catalog Type Problem | 3 | | 2 | - | |
| ZOK_QN | D_CODE | Problem or Damage Code | 4 | | | - | |

| Save | Edit | Close | Read Only | Save As | Refresh | Check Consistency | Test | Delete |

210 ⟵

Query View ID:
Chart ID:* ZOK_QN / ZOK XC1
Description:
212 — Technology:* Xcelsius Dashboard Xcelsius Dashboards Folder: /sap/public/businessuite/bcv
214 — File Path: /sap/public/businessuite/bcv/ZOK_7.swf
Name of SWF File: ZOK_7.swf Upload file to repository Quick Info Text:
Chart Type: Display Xcelsius Flash Island Mapping to Xcelsius Interface
Generate XC Fields

| Xcelsius Field | Query ID | Query Field ID |
|---|---|---|
| DAMAGES | ZOK_QN | ZDAM_NUM |
| LABELS | ZOK_QN | CODE_TEXT |

FREQUENCY-BASED SORTING ALGORITHM FOR FEATURE SPARSE NLP DATASETS

CROSS-REFERENCE TO RELATED APPLICATIONS

This application claims the priority benefit of all of the following: U.S. Provisional Patent Application 62/446,088 filed on Jan. 13, 2017, A Continuation-In-Part of patent application Ser. No. 16/236,551 filed on Dec. 30, 2018, which is a Continuation-In-Part of patent application Ser. No. 16/140,508, filed on Sep. 24, 2018, which claims the priority benefit of U.S. Provisional Patent Application 62/720,207, filed on Aug. 21, 2018. This application is also a Continuation-In-Part of patent application Ser. No. 16/043,168, filed on Jul. 24, 2018, which claims the priority benefit of U.S. Provisional Patent Application 62/612,438, filed on Dec. 30, 2017, U.S. Provisional Patent Application 62/612,435, filed on Dec. 30, 2017, U.S. Provisional Patent Application 62/612,437, filed on Dec. 30, 2017, which is a Continuation-In-Part of patent application Ser. No. 16/041,851, filed on Jul. 23, 2018, which is a Continuation-In-Part of patent application Ser. No. 16/041,792, filed on Jul. 22, 2018, which is a Continuation-In-Part of patent application Ser. No. 15/811,688, filed on Nov. 14, 2017, which is a Continuation-In-Part of patent application Ser. No. 15/810,297, filed on November 13, which is a Continuation-In-Part of patent application Ser. No. 15/596,648, filed on May 16, 2017, which is a Continuation-In-Part of patent application Ser. No. 15/592,689, filed on May 11, 2017, which is a Continuation-In-Part of patent application Ser. No. 14/606,946, filed on Jan. 27, 2017, which claims the priority benefit of U.S. Provisional Patent Application 62/538,941, filed on Jul. 31, 2017, U.S. Provisional Patent Application 62/451,321 filed on Jan. 27, 2017,

BACKGROUND

Field of the Invention

This invention relates generally to event/message processing for a managed infrastructure, and more particularly to systems and associated methods for frequency-based sorting logic relative to feature spare NLP datasets.

Description of the Related Art

In a data processing environment, data collection is the process of collecting values for computer system or network metrics using a data collection facility, such as SNMP.

SNMP is a protocol used by network hosts to exchange information used in the management of networks, such as Internet Protocol (IP) networks. SNMP network management is based on the client and server model. An SNMP client sends a request for SNMP data to an SNMP managed server or host. Each managed host runs a process called an agent, known as an SNMP Agent. The SNMP agent is a server process that maintains a management information base (MIB) database for the host. The SNMP managed host sends a response that includes the requested data that is stored in the management information base to the SNMP client.

Existing procedural approaches to SNMP data collection suffer from a number of drawbacks. Procedural solutions are typically developed and optimized for a certain data collection scenario (i.e., within a particular computer environment) and reflect a certain set of assumptions. As a result, an SNMP collection procedure may become sub-optimal or unsuitable when used in a different environment.

Large Internet Service Providers (ISPs) and carriers have multiple families and generations of networking equipment with various SNMP-related idiosyncrasies and constraints. The same logical data (e.g., interface octet counter) can be collected in a number of alternative ways, some of which are better than the others. For instance, a straightforward SNMP data collection procedure may produce poor data collection results, while a sophisticated SNMP data collection procedure which offers better data collection results may be difficult to develop.

Although brute-force data collection methods may be used which systematically enumerate all possible data collection candidates for a procedural solution and check whether each data collection candidate satisfies the problem's statement, many brute-force data collection procedures scale poorly when management information base tables become very large. Thus, size and scale of the management information base tables in an SNMP environment may dictate using different procedures for collecting SNMP data. In addition, the complexity of a procedural solution increases very rapidly when a data collection scenario involves correlating data from a number of related management information base tables.

SNMP uses one or more managers to monitor and manage hosts and devices on computer networks. Each managed system executes an agent. The agent then reports information using SNMP to the manager.

SNMP provides variable accessibility organized in hierarchies. These hierarchies, and other metadata (such as type and description of the variable), are described by the MIB s.

However, MIB is an arcane language, not properly machine readable and usually object oriented. With SNMP the agent(s) manage the MIB(s), and update them. The agents are heavily dependent on a static difficult update. With SNMP it is difficult to update the agent(s).

SUMMARY

An object of the present invention is to provide a system in communication with a managed infrastructure, that does not require element-wise comparison between several lists, and uses intersection between sets.

Another object of the present invention is to provide a system in communication with a managed infrastructure, that requires minimal configuration, such as only two corpora, and no other input parameters.

A further object of the present invention is to provide a system in communication with a managed infrastructure, that drastically reduces an amount of data need to get all unique tokens, saves time and can get the most out of feature spare datasets.

BRIEF DESCRIPTION OF THE DRAWINGS

FIGS. 3(a) and 3(b) illustrate embodiments of dashboards that can be accessed by users of the event clustering system.

FIG. 4 illustrates processing of alerts, and a matrix M, in one embodiment of the present invention.

FIG. 16 is a screen display of the dashboard external interface screen that may allow another software program to transmit data in the data range.

FIG. 17 is a screen display that allows a user to choose a chart view in order to display data in a graphical format.

FIG. 18 is an example screen display showing the data mapping feature of the dashboard configuration screen.

DETAILED DESCRIPTION

Figure 1:
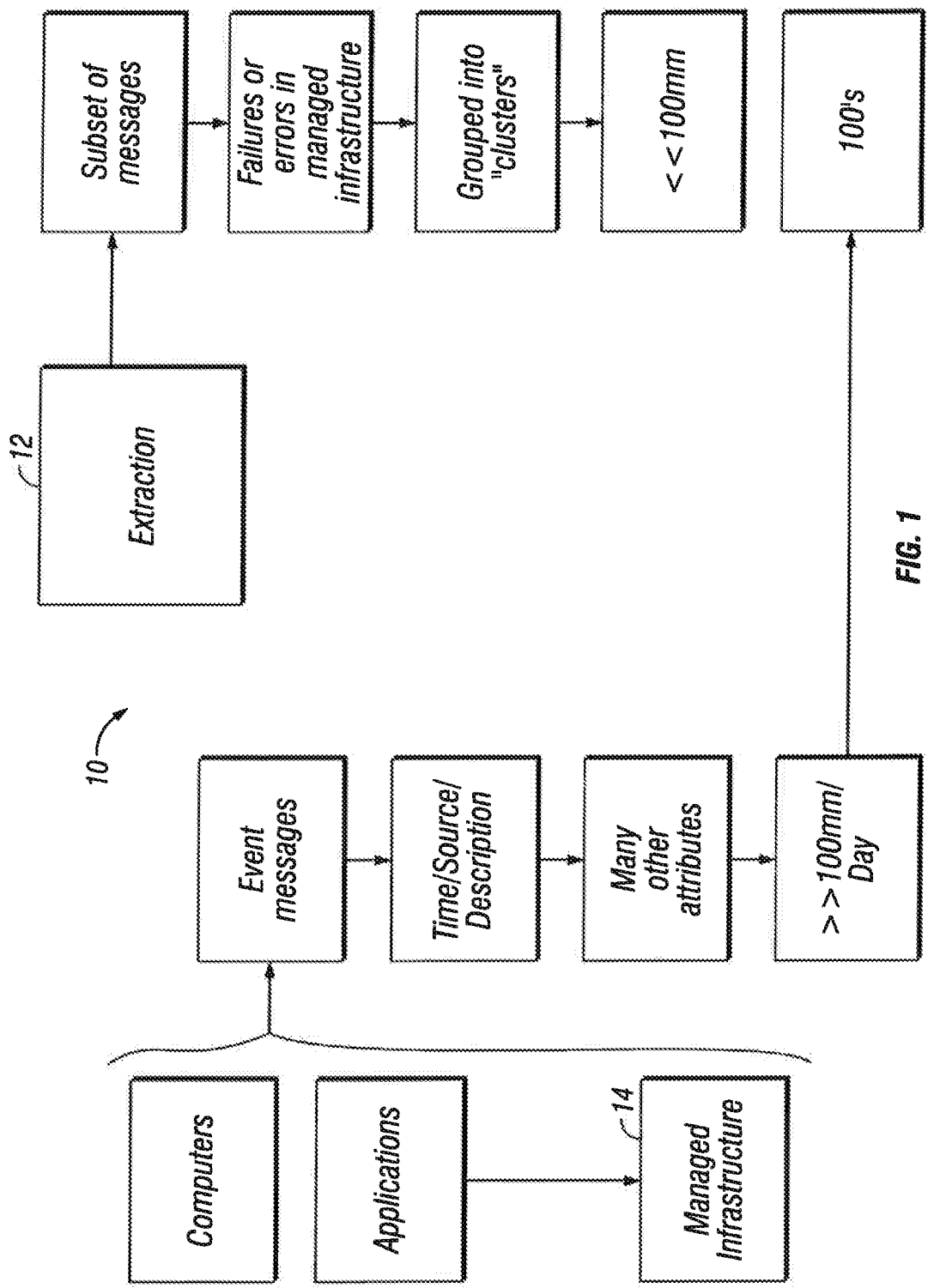
FIG. 1 illustrates one embodiment of an event clustering system of the present invention.

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving a wireless signal, decoding if needed, and exchanging information with a server to send and receive cultural information data including survey data. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein, the term "computer" is a general-purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

As used herein, the term "Internet" is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email. The communications infrastructure of the Internet consists of its hardware components and a system of software layers that control various aspects of the architecture.

As used herein, the term "extranet" is a computer network that allows controlled access from the outside. An extranet can be an extension of an organization's intranet that is extended to users outside the organization in isolation from all other Internet users. An extranet can be an intranet mapped onto the public Internet or some other transmission system not accessible to the general public, but managed by more than one company's administrator(s). Examples of extranet-style networks include but are not limited to:
  LANs or WANs belonging to multiple organizations and interconnected and accessed using remote dial-up
  LANs or WANs belonging to multiple organizations and interconnected and accessed using dedicated lines
  Virtual private network (VPN) that is comprised of LANs or WANs belonging to multiple organizations, and that extends usage to remote users using special "tunneling" software that creates a secure, usually encrypted network connection over public lines, sometimes via an ISP.

As used herein, the term "Intranet" is a network that is owned by a single organization that controls its security policies and network management. Examples of intranets include but are not limited to:
  A LAN
  A Wide-area network (WAN) that is comprised of a LAN that extends usage to remote employees with dial-up access
  A WAN that is comprised of interconnected LANs using dedicated communication lines
  A Virtual private network (VPN) that is comprised of a LAN or WAN that extends usage to remote employees or networks using special "tunneling" software that creates a secure, usually encrypted connection over public lines, sometimes via an Internet Service Provider (ISP).

For purposes of the present invention, the Internet, extranets and intranets collectively are referred to as ("Network Systems").

For purposes of the present invention, the term "Infrastructure" means, information technology, the physical hardware used to interconnect computers and users, transmission media, including telephone lines, cable television lines, and satellites and antennas, and also the routers, aggregators, repeaters, computers, network devices, applications, and other devices that control transmission paths, software used to send, receive, and manage the signals that are transmitted, and everything, both hardware and software, that supports the flow and processing of information.

As used herein, "event message" or "event" is defined as a change in state. An event is anything that happens, or is contemplated as happening in message form or event form relating to infrastructure. An event can include a time stamp, and a name for the entity changing state.

Referring to FIG. 1, a system 10 is provided for clustering events received from an infrastructure 14.

In one embodiment the system 10 is an event clustering system 10 that includes an extraction engine 12 in communication with an infrastructure 14. As a non-limiting example, infrastructure 14 includes, computers, network devices, appliances, mobile devices, applications, connections of any of the preceding, text or numerical values from which those text or numerical values indicate a state of any hardware or software component of the infrastructure 14. The infrastructure 14 generates data that includes attributes. As a non-limiting example, the data is selected from at least one of, time, source a description of the event, textural or numerical values indicating a state of the infrastructure 14. The extraction engine 12 breaks event messages into subsets of messages that relate to failures or errors in the infrastructure 14. The subsets of messages can be grouped into clusters.

In one embodiment, the extraction engine 12 includes a server. The extraction engine 12 extracts text components from the event messages and converts them into words and subtexts. The extraction engine 12 then reformats data from the event messages to create reformatted data. In one embodiment, the reformatted data is received at a system bus.

In one embodiment the events are converted into words and subsets to group the events into clusters that relate to security of the managed infrastructure. In response to grouping the events, physical changes are made to at least a portion of the physical hardware. In response to the production of the clusters security of the managed infrastructure is maintained.

In one embodiment security includes at least one of managed infrastructure: breach, intrusion or propagation. In one embodiment security includes managed infrastructure: access control, intrusion detection and threat propagation. As non-limiting examples security includes at least one of: authentication of a subject; authorization to the managed infrastructure of a subject; authorization that specifies what a subject can do relative to the managed infrastructure; audit; identification and authentication to ensure that only authorized subjects can access the managed infrastructure; and access approval grants to the managed infrastructure by association of users with resources that they are allowed to access, based on an authorization policy.

Figure 2:
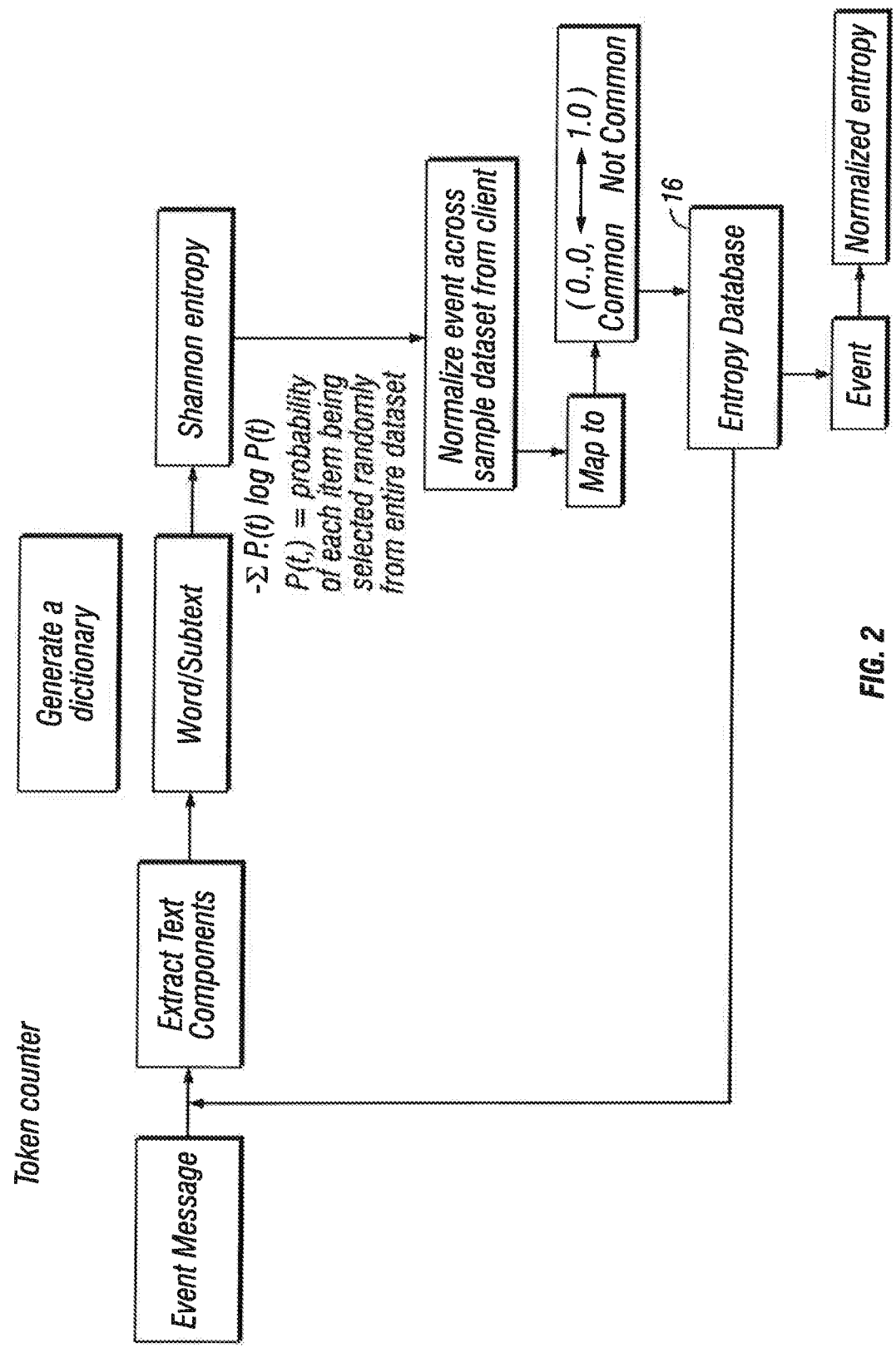
FIG. 2 illustrates a token counter, text extraction and implementation of Shannon entropy in one embodiment of the present invention.

The extraction engine 12 receives infrastructure 14 data and produces clustering events and populates a database 16 with a dictionary of event entropy. This can be achieved with a token counter as illustrated in FIG. 2. As a non-limiting example, the database 16 can be a no-SQL relational database 16. In one embodiment, an entropy database 16 is generated with the word and subtexts. As a non-limiting example, the entropy database is generated using Shannon Entropy, −ln(1/NGen) and normalizes the words and subtexts as follows:

$$-\Sigma P \cdot (t) \log P(t)$$

where,
P(t)=probability of each item is selected randomly from an entire dataset.

An entropy database can be provided. In one embodiment, the entropy normalizes clustering events across data, datasets, from the infrastructure 14. As a non-limiting example, normalized entropy for clustering events is mapped from a common, 0.0 and a non-common, 1.0, as discussed hereafter. Entropy is assigned to the alerts. The entropy for each event is retrieved from an entropy dictionary, as it enters the system 10. This can be done continuously in parallel with other operation of the extraction engine 12 or run non-continuously.

Figure 3B:
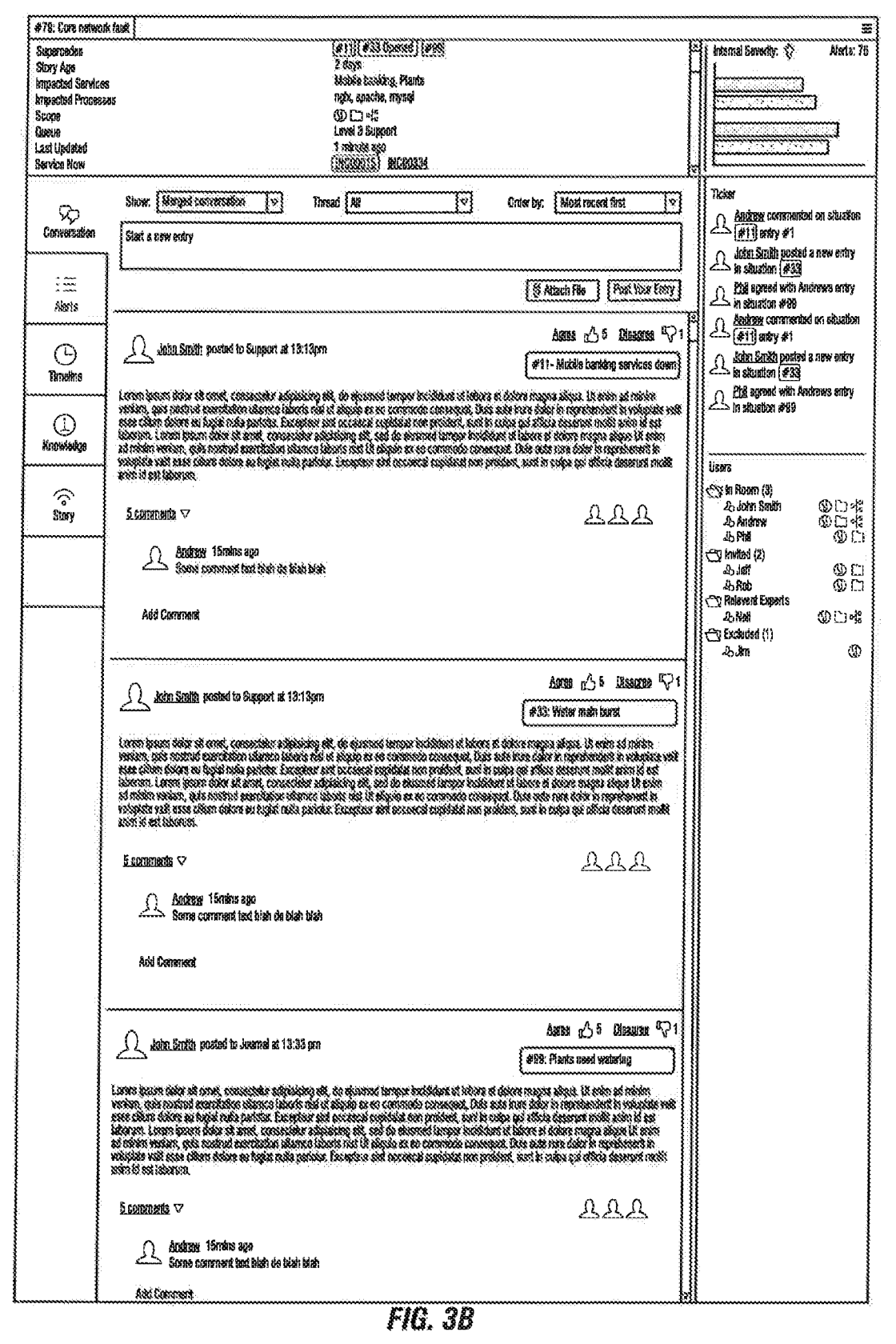

In one embodiment, illustrated in FIGS. 3(a) and 3(b) a dashboard 18, associated with a situational room, is included which allows entities and/or people to manipulate messages/clustering events from infrastructure, alerts or clustering events.

An alert engine 20 receives the clustering events and creates alerts that are mapped into a matrix "M" of clustering events, as illustrated in FIG. 4 and as more fully explained hereafter. As a non-limiting example, $M_{ik}$ is the matrix of clustering events.

Figure 5:
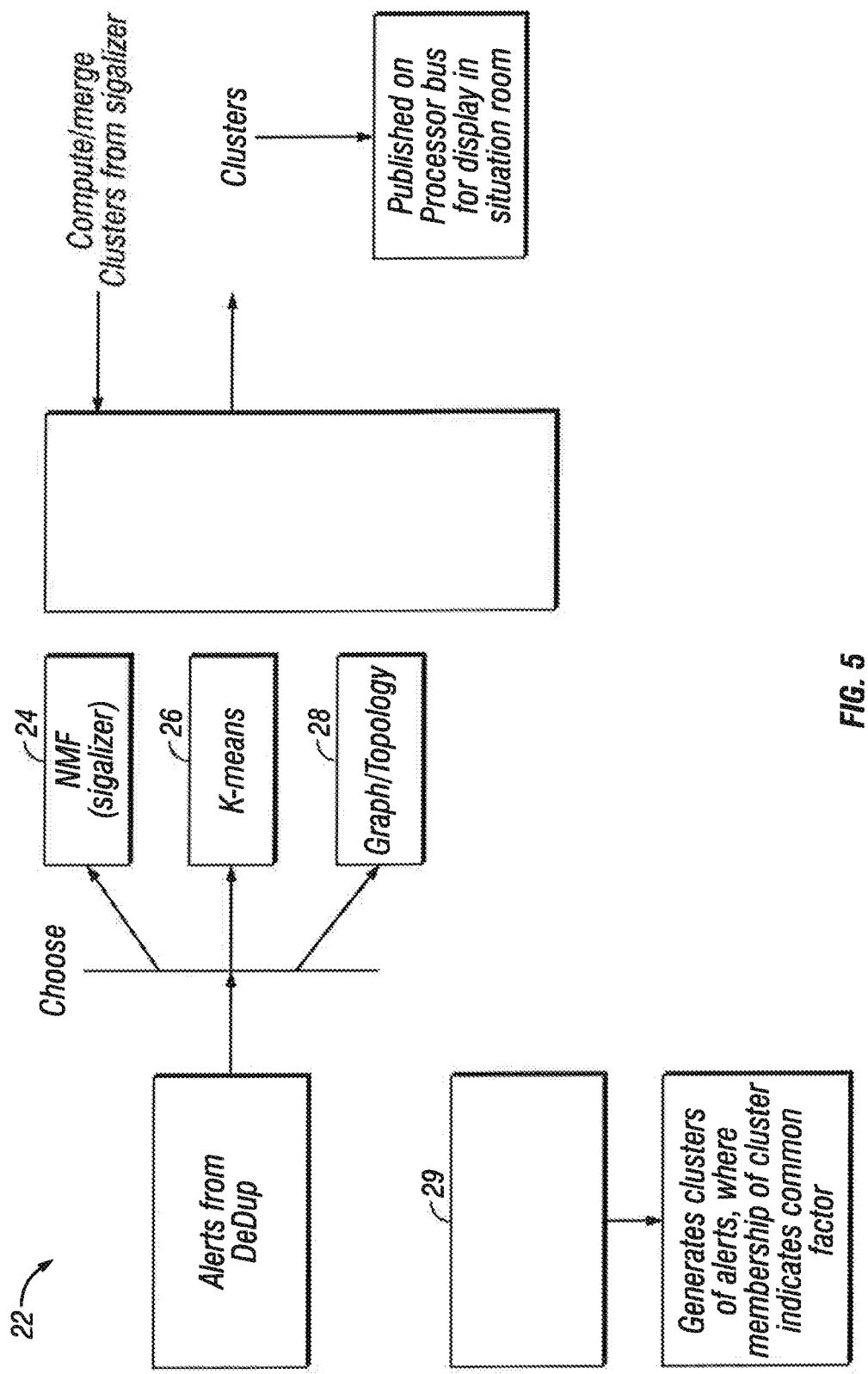
FIG. 5 illustrates an embodiment of a sigalizer engine and the creation of alerts where member of cluster indicates common factors in one embodiment of the present invention.

A sigalizer engine 22 includes a plurality of engines as illustrated in FIG. 5. As non-limiting examples, an NMF engine 24, a k-means clustering engine 26 and a topology proximity engine 28 are provided. Each signalizer engine 22 includes a processor and an arithmetic logic unit "ALU". Examples of suitable ALUs are found in EP 0171190 and EP 0271255, fully incorporated herein by reference. In one embodiment, the sigalizer engine 22 determines one or more steps from clustering events and produces clusters relating to the alerts and or clustering events.

The sigalizer engine 22 determines sigalizer common steps to ascertain how many clusters to extract from clustering events. Membership in a cluster indicates a common factor, which can be a failure or an actionable problem in the infrastructure 14. The sigalizer engine 22 generates clusters of alerts. In one embodiment, an independent failure count detection engine 29 is used for the production of common steps designated as "k" from clustering events. The independent failure count detection engine 29 can use SVD decomposition. The SVD decomposition is a continuation of a determination of sigalizer 22 common steps.

K is the number obtained from the common sigalizer steps. As a non-limiting example, common sigalizer steps are designated as $M_{ij}$, where i are unique clustering events and are the rows of M, j represents the time buckets in M. A value for $M_{ij}$ equals the number of occurrences of event i in time bucket j. This is the common input to the sigalizer engines 22.

Figure 6:
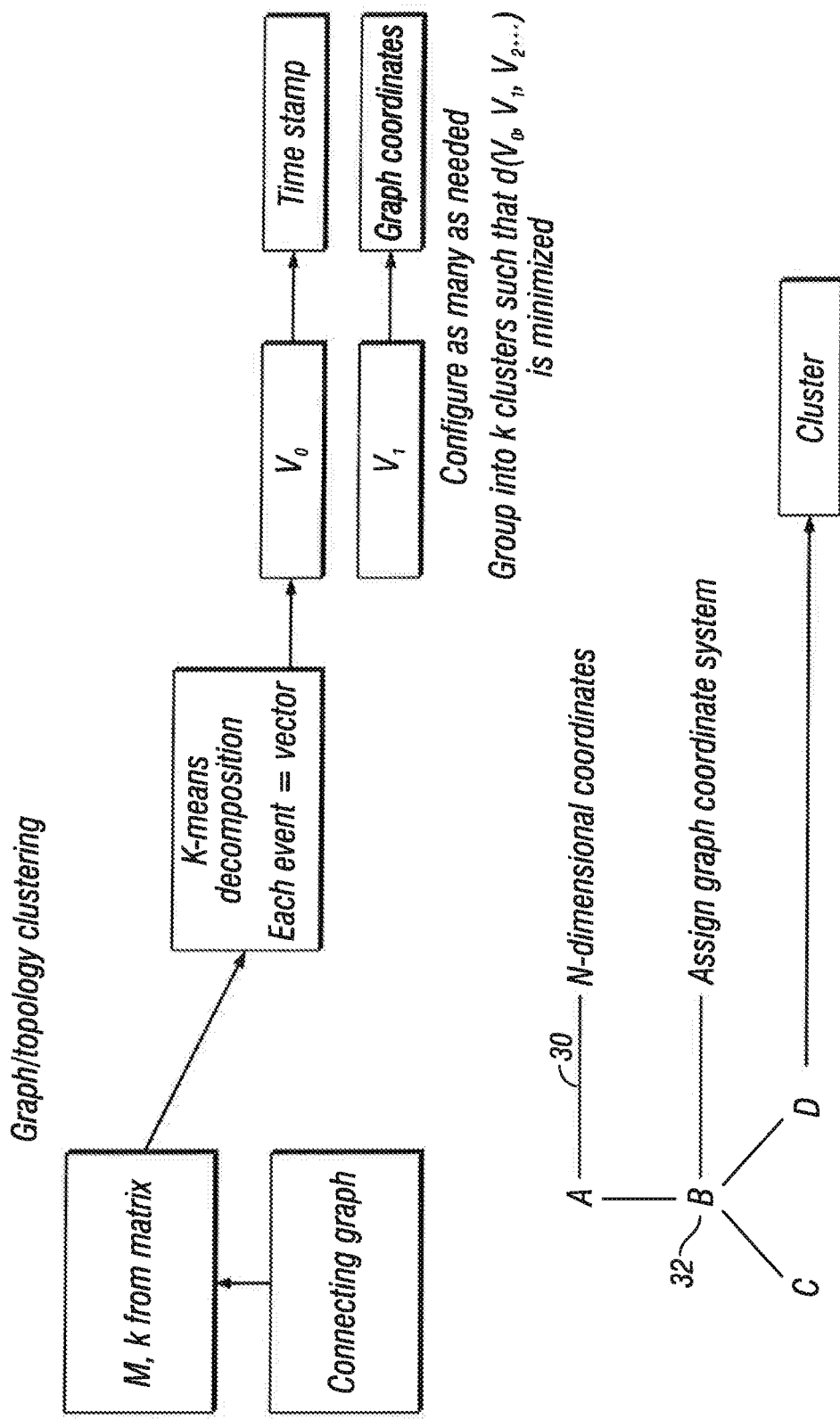
FIG. 6 illustrates k-mean decomposition, a created graph with graph coordinates in one embodiment of the present invention.

The topology proximity 28 creates a graph coordinate system, FIG. 6. In one embodiment the topology proximity 28 uses a source address for each event to assign a graph coordinate 30 of a graph 32, with nodes, to the event with an optional subset of attributes being extracted for each event and turned into a vector. The topology proximity engine 28 executes a graph topology and proximity algorithm.

Figure 7:
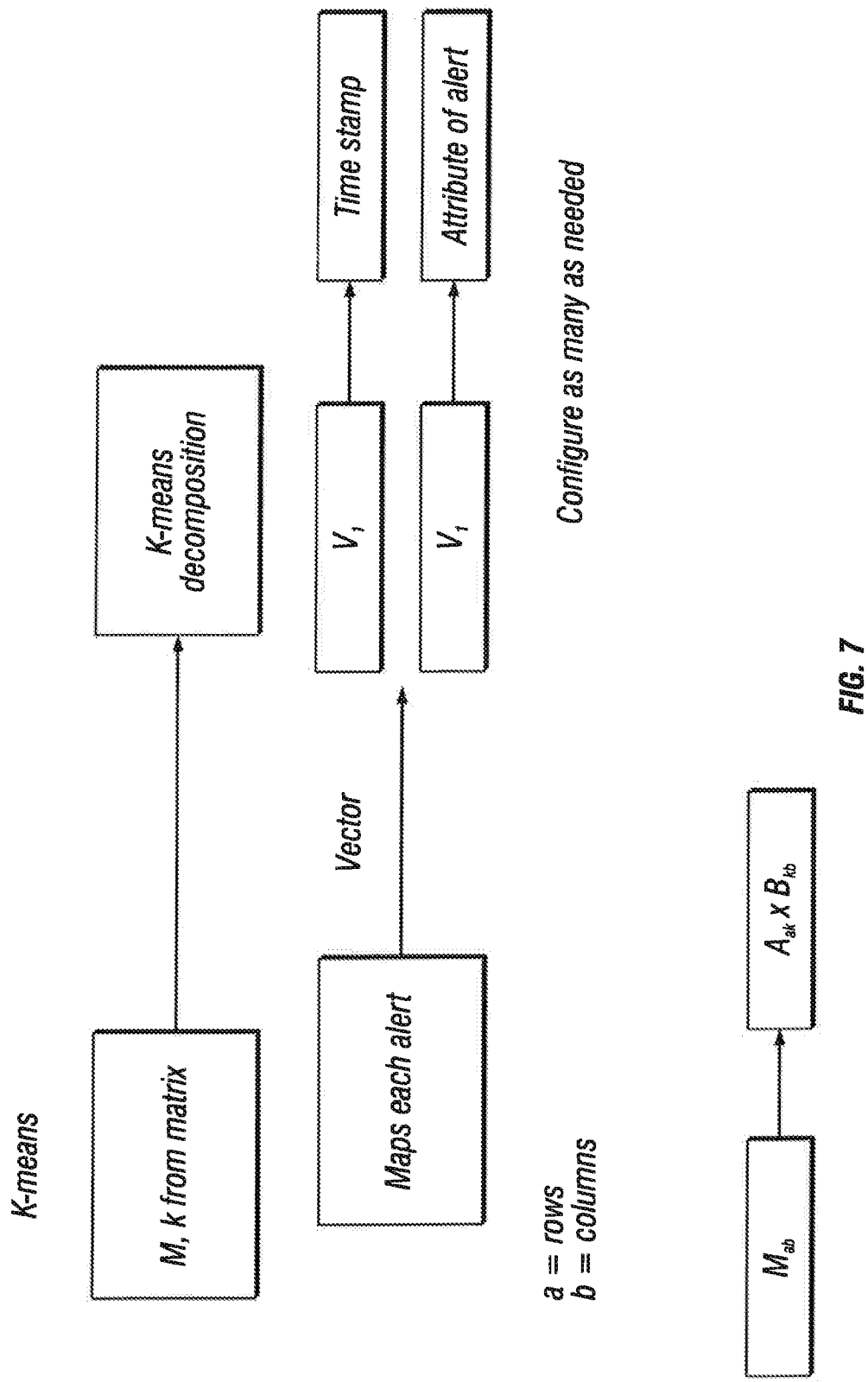
FIG. 7 illustrates one embodiment of alert mapping and vector generation in one embodiment of the present invention.

$M_{ik}$ undergoes K-means decomposition, FIG. 7. Each event is a transformed vector, where ($V_o$ is transformed time stamp, $V_i$, $-V_n$ and so forth are transformed graph coordinates 30) are grouped into k clusters such that $d(V_i, V_2)$ is minimized. In one embodiment, the topology engine 28 inputs a list of devices and a list of hops, where hop is a connection between components or nodes in the infrastructure 14.

As a non-limiting example, the graph 32 can be constructed of any number of points or nodes: A, B, C, and D, which relate to the source of an event. The result is a connecting graph 32, FIG. 6.

The topology proximity engine 28 receives the coordinate's mapping, and clusters are generated. V base nodes calculate a minimum hop to every other node which gives coordinate and the graph coordinates 30 are mapped.

In one embodiment, the k-means clustering engine 26 uses the graph coordinates 30 to cluster the clustering events using a k-means algorithm to determine hop proximity of the source of the event.

M,k is processed by the sigalizer engine 22. Mab is transformed to $A_{ak}$ $B_{kb}$, where a equals rows, and b equals columns, x defines the normal operation of matrix multiplication. M is the matrix as stated above, and k is as recited above.

Figure 8:
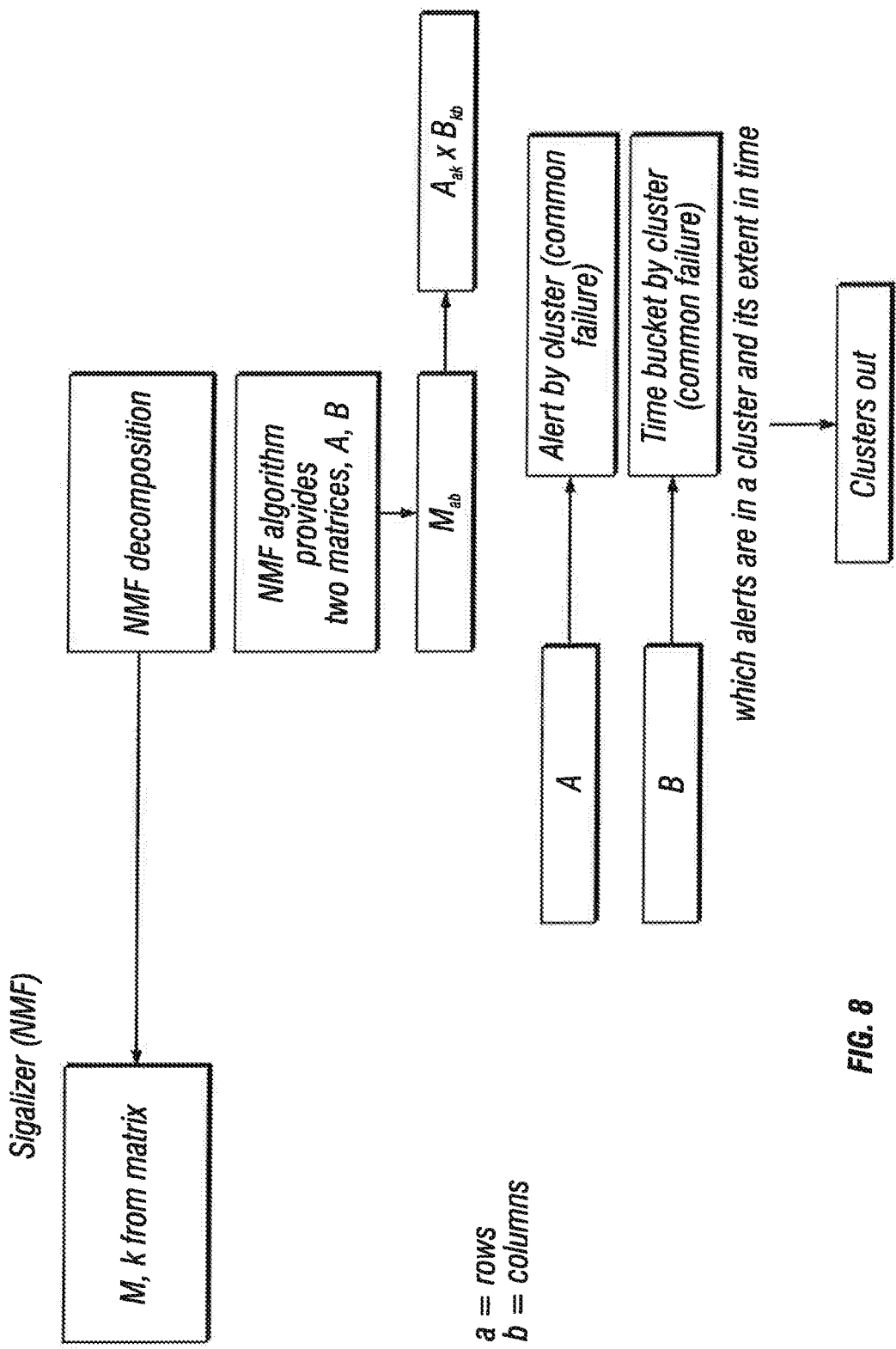
FIG. 8 illustrates NMF decomposition in one embodiment of the present invention.

The NMF algorithm produces two matrices, A and B, FIG. 8. A represents by cluster (a common failure) and B represents time bucket by cluster (a common failure). In one embodiment, the NMF engine 24 factors the matrix M into A and B, where A are deemed to be significant and are extracted, e.g., clusters deemed significant are extracted. The system 10 looks for significantly high values as compared to statistically significant values in the A and B matrix. If they are not statistically significant, they are dropped. The statistically significant elements of M are used to determine a cluster. As a non-liming example, the determination of significance is based on high signatures in the matrix. As above, those that are not high enough are dropped and not included in the output of clusters which is produced.

Each alert is mapped to a vector, $V_0$-$V_n$, where $V_o$ is a time stamp t; $V_i$ is an attribute of alert. In one embodiment, attributes of an event are mapped to a vector V.

The vectors are grouped into k clusters using k-means such that $d(V_i, V_2)$ is a minimum in its own cluster.

In one embodiment the grouping is executed also using a standard Euclidian distance. In one embodiment, a weighting of components is supplied. The system 10 transforms the alert attributes into a number value that is used as the components of the vector. As a non-limiting example, an alert attribute is a textual value. In one embodiment, similar attributes are mapped to numbers that are also similar or close relative to the graph, with the closeness being dynamic and can be predetermined, changed, modified, set, and the like.

In one embodiment of the matrix, M, columns are slices in time and the rows are unique alerts. A unique alert is received from the deduplication engine which eliminates duplications and creates unique alerts.

In one embodiment, the matrix, M is created with alert/time and a fixed number of common alerts. The matrix M can be dynamic and change in time. The matrix M includes rows that can be unique alerts. The matrix includes columns that are time buckets, and a number of occurrences are plotted.

Evaluated clustering events are either discarded or passed to clusters with alerts are collected into time buckets and mapped in the matrix M. In one embodiment, a bucket width is a parameter that can be an input to the signalizer engine 22.

Outputs from the sigalizer engines 22 are received at a compare and merge engine 34. The compare and merge engine 34 communicate with one or more user interfaces 36 in the situation room 18, FIG. 9. The three sigalizer algorithms are used with the comparison or merger engine 34 and clusters are published on a system bus 38 for display in the situation room 18.

As a non-limiting example, the bus 38 can be a publication message bus. As a non-limiting example, the bus 38 processes anything that goes from A to B, and from B to A. In one embodiment, a data bus web server is coupled to user interfaces as illustrated in.

Figure 9:
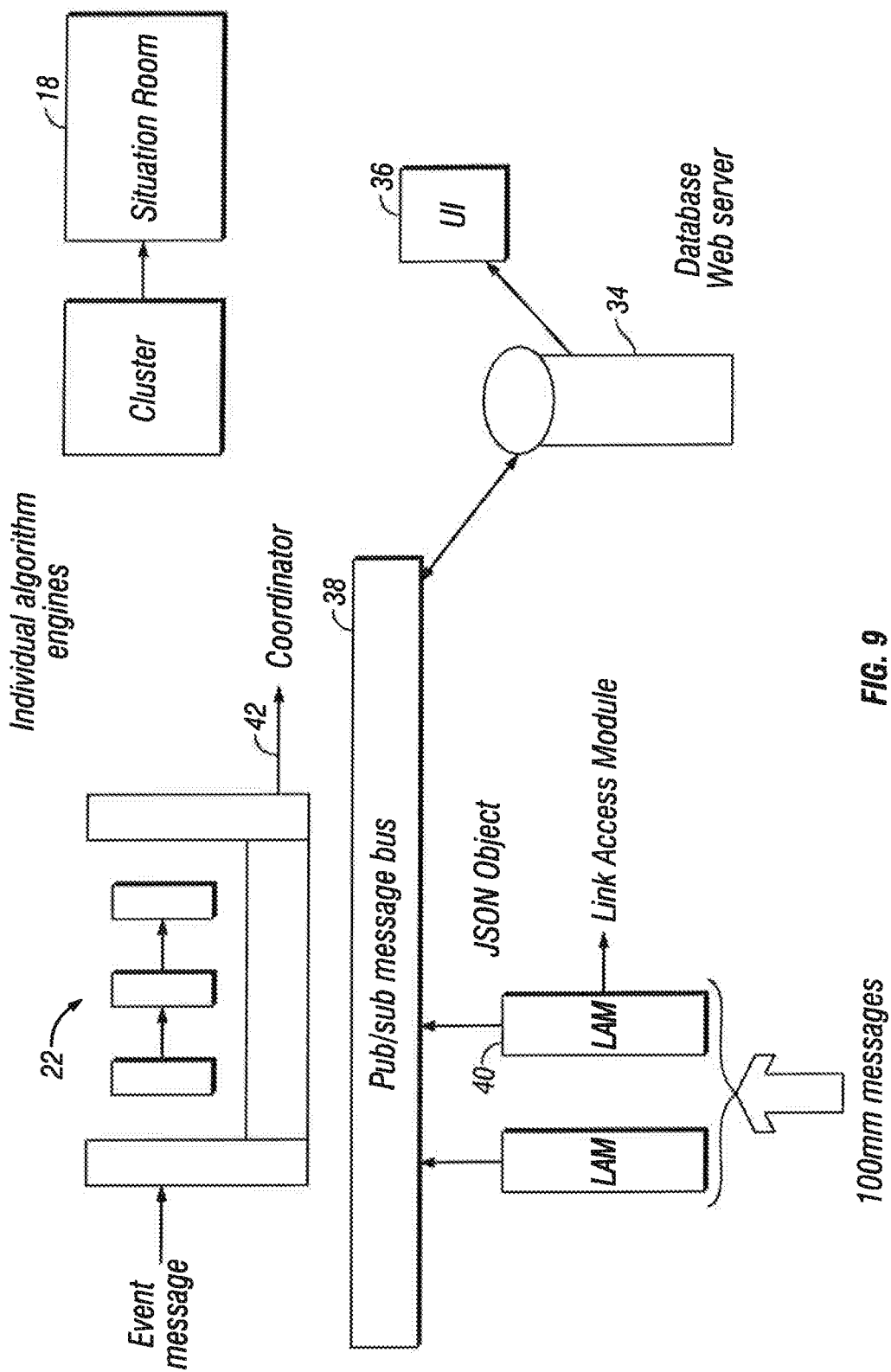
FIG. 9 illustrates the interaction of link access modules with a message bus, algorithm engines, cluster creation and a situation room in one embodiment of the present invention.

As illustrated in FIG. 9, a plurality of link access modules 40 are in communication with the data bus 38 and receive messages/clustering events. Events are received by a coordinator 42 that executes clustering of the clustering events.

In one embodiment, normalized words and subtexts are mapped to a common, 0.0 and a non-common, 1.0, as illustrated in FIG. 2.

The alerts can be run in parallel with the activities of the system 10. The alerts are passed to the sigalizer engine 22, FIG. 5.

Figure 10:
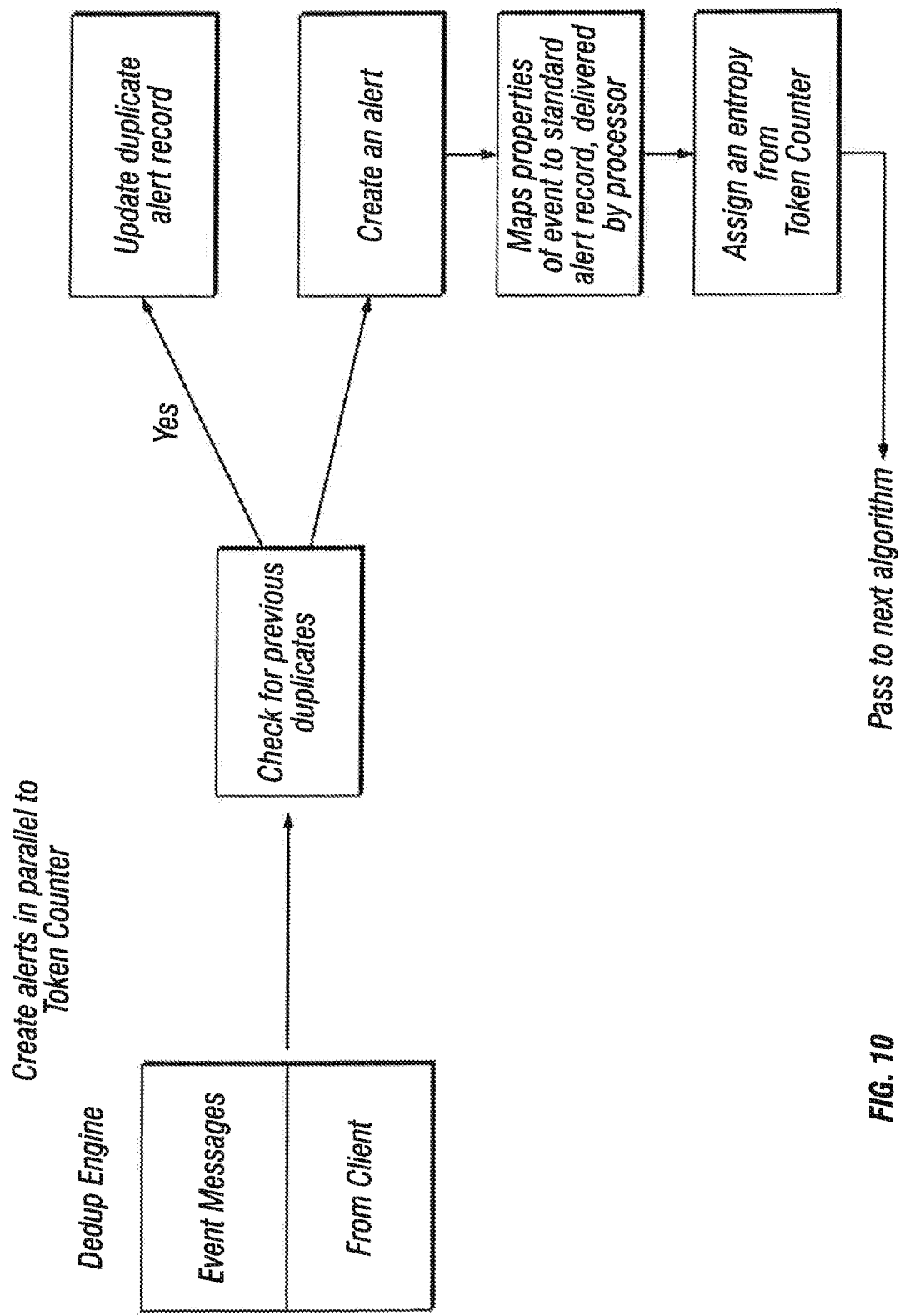
FIG. 10 illustrates one embodiment of a deduplication engine that can be used with the present invention.

In one embodiment, a deduplication engine 44 is used for event messages of data streams received from the client, FIG. 10. The deduplication engine 44 eliminates duplicate copies of repeating data. In one embodiment, the deduplication engine reduces a number of bytes in network data transfers that need to be sent.

A computer scripting language script language can be included that alters the clustering events or flow of clustering events. As non-limiting examples, the scripting language can be, Java, C, C++,C#, Objective-C, PHP, VB, Python, Pearl, Ruby, JavaScript and the like.

In one embodiment, the NMF, k-means, and/or topology proximity algorithms are optionally repeated. The repeating can be performed by varying k from the previously performed common steps in the sigalizer engine 22, and optionally along with the SVD decomposition.

Optionally, generated clusters are tested against a quality function supplied by the system 10 which evaluates a cluster's uniformity. In one embodiment, the system 10 selects a best set clusters against the quality clusters.

Figure 11:
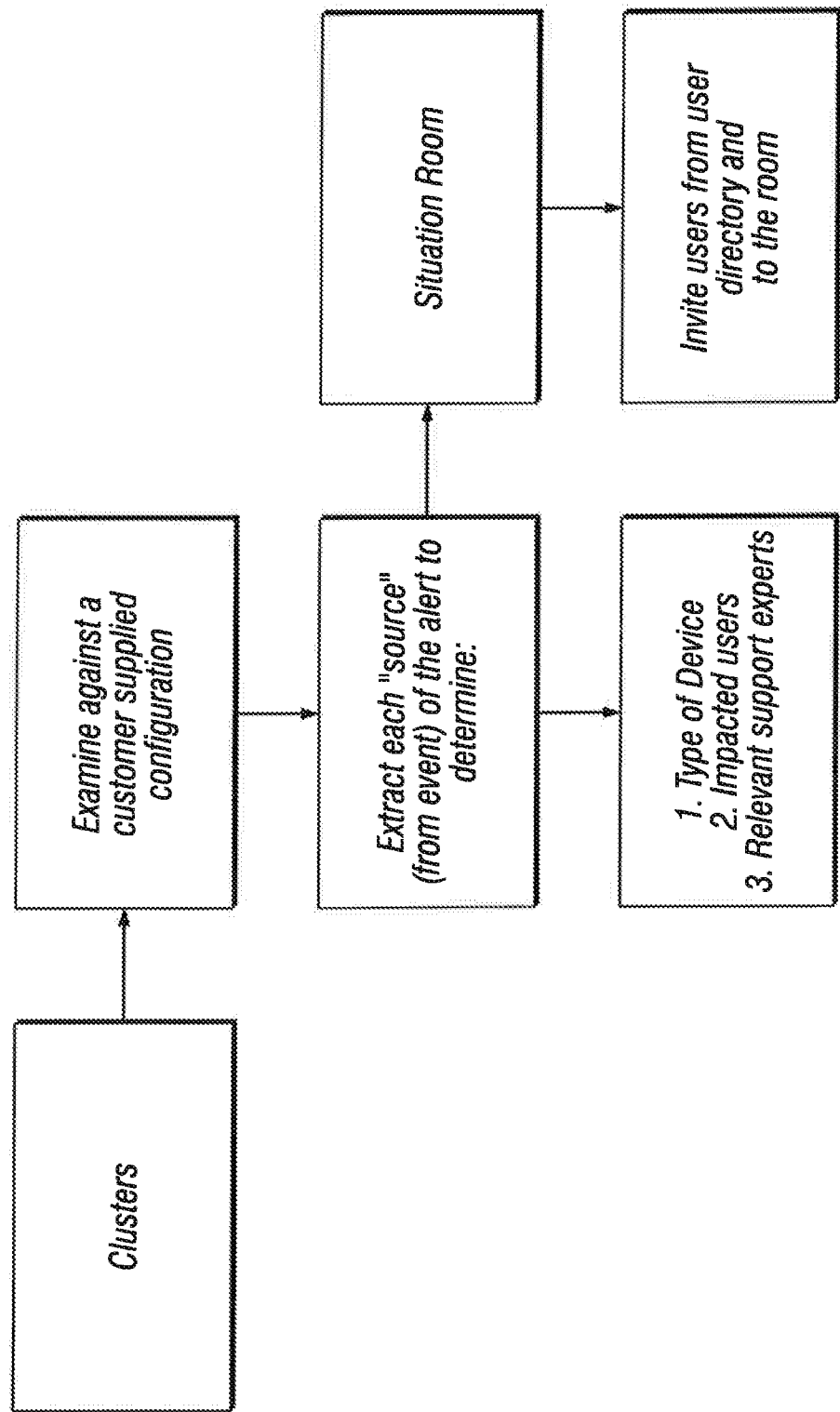
FIG. 11 illustrates one embodiment of actions that can be taken following event clustering generation.

As a non-limiting example, clusters are examiner against a customer supplied configuration database for each source of an event. As a non-limiting example, the examining can be performed to determine: a type of device; impacted users; relevant support experts, and the like, FIG. 11.

Example 1

As a non-limiting example, the NMF algorithm can be executed as follows:

Let $M_{ij}$ by a n×p non-negative matrix, (i.e., with M>0, and k>0 an integer).

Non-negative Matrix Factorization (NMF) consists in finding an approximation $$X = WH(A\ B), \qquad (1)$$

where W, H are n k and k p non-negative matrices, respectively. In practice, the factorization rank r is often chosen such that r<<min(n, p) but is determined.

The main approach to NMF is to estimate matrices W and H as a local minimum: 1) M=A B A, B seed randomly tentatively adjusts A, B until the Frobenius distance ||M−AB|| is minimized where D is a loss function that measures the quality of the approximation. Common loss functions are based on either the Frobenius distance or the Kullback-Leibler divergence.

R is an optional regularization function, defined to enforce desirable properties on matrices W and H, such as smoothness or sparsity.

Example 2

As a non-limiting example, a k-means algorithm is used as follows: Given a set of event vectors $(x_1, x_2, \ldots, x_n)$, where each observation is a d-dimensional real vector, k-means clustering aims to partition the n observations into k sets (k≤n) $S = \{S_1, S_2, \ldots, S_k\}$ so as to minimize the within-cluster sum of squares (WCSS):

$$\arg\min_S \sum_{i=1}^{k} \sum_{x_j \in S_i} \|x_j - \mu_i\|^2$$

where $\mu_i$ is the mean of points in $S_i$.

In one embodiment of the situation room 18, as illustrated in FIG. 1, a system 110 is provided for creating, and displaying in a dashboard directed to the system 10 from clustering messages received from the infrastructure 14, also known as the dashboard system for the situation room 18.

In one embodiment, the situation room 18 has a display that can be interactive. The situation room 18 can be coupled to or includes a dashboard design system 112, display computer system 114, and a data system 116.

In one embodiment, the system includes dashboard converter logic 118, data range determination logic 132, dashboard component generator 122, external interface logic 124, graphic library 126, and network interface logic 128. In one embodiment, the system includes data processing computing systems.

In one embodiment, the dashboard file converter logic 118 converts the situations and alerts from system 10 from clustering messages received from the infrastructure 14 data structures and data, to be compatible with or match with the interface logic 124.

In one embodiment, the logic 118 provides communication between the graphical dashboard and the problem walls from clustering messages received from the infrastructure 14

The problem walls from clustering messages received from the infrastructure 14 are provided as disclosed above.

In one embodiment, the logic 132, dashboard component generator 122 and the external interface logic 124 are each used for designing the problem walls from clustering messages received from the infrastructure 14.

A dashboard or SWF file can be included that establishes a data range, type of components and the external interface. In one embodiment, the logic 132 is used for a data range in a spreadsheet associated with the dashboard file used to generate a visual display.

In one embodiment, a dashboard component generator 122 is provided that allows a user to place problem walls from clustering messages received from the infrastructure 14 components with various attributes onto a canvas. The canvas can be a space where various visual components are.

In one embodiment, the user is able to choose components directed to problem walls from clustering messages received from infrastructure 14 elements from a different component. These can be included in a panel and the user can then place them on the canvas in any way that the user desires.

In one embodiment, the components are provided by the client, by the system, by third parties, and from third parties. Examples of other components include but are not limited to, graphs, style of presentation, additional information, comparisons, trends, artistic elements, text, and the like. In some embodiments, the user, or client can select the background, margins, presentation of elements and the like.

In one embodiment, an external interface logic 124 is provided. The interface logic allows a dashboard to provide data ranges, permutations, trends, activities, and the like associated with problem walls from clustering messages received from the infrastructure 14. In one embodiment, interface logic 124 allows the business application software to export application data to be displayed in a dashboard in an interactive visual format.

In various embodiments, a network interface logic 128 and 130 allows for connectivity of the dashboard design system 112, display computer system 114 and data system 116 to each other, or to public networks. In one embodiment, a graphical file that has been configured by the computer system 112 is stored in the data storage system 136. In one embodiment, the graphic file is used for data mapping, both during and after design time, and can generate the display during a period of execution. The external adapter can be utilized for communication between the data storage system 136 and the graphical file.

In one embodiment, network interface logics 128 and 130 allow computer systems 112, 114 and 116 to connect to each other and the other computer systems. As a non-limiting example, the network interface logic 128 and 130 can be one or more computers or web servers that provide a graphical user interface for clients or third parties that access the subsystems of system 112, 114 or 116 through the internet or an intranet protocol. The network interface logic 128, and 130 can include other logics configured to provide interfaces for other types of devices, including but not limited to mobile devices, server-based computing systems, and the like.

As a non-limiting example, in one embodiment, the display computer system 114 includes, network interface logic 130, context viewer system 138, data storage system 136 and dashboard display system 140.

In another embodiment, the dashboard display system 140 is included in the context viewer system 138, and be executed in a machine, one or more display and other computers, with machine-readable storage media, cache, memory, flash drive or internal or external hard drive or in a cloud computing environment, non-transitory computer readable media or non-transmissible computer-readable media, with stored instructions executed by the machine to perform the operations. In one embodiment, the context viewer system 138 is a program product that performs various processing functions. As non-limiting examples, these functions can include, receiving data from the data source, preparing data by aggregating, providing access to visualization capabilities, and the like.

In one embodiment, the data storage system 136 stores data related to problem walls from clustering messages received from the infrastructure 14 applications executed on the display computer system 114.

In one embodiment, the data storage system 136 stores problem walls from clustering messages received from the infrastructure 14 data or statistical data. As a non-limiting example, the dashboard display system 140 communicates with the display computer system 114 to display problem walls from clustering messages received from infrastructure 14 data in a dashboard in a visual manner or in visual components using graphics. Displaying problem walls from clustering messages received from infrastructure 14 data graphically may include displaying bar graphs and/or pie charts or other visual displays. In order to generate the dashboard display, the client can map dashboard data fields to the problem walls from clustering messages received from infrastructure 14 data fields. This allows access of data from problem walls from clustering messages received from infrastructure 14 without data replication.

Embodiments of the data storage system 136 may store a variety of information including application data in database 130. The application data database 130 may receive data from the data system 116. The data storage system 136 may provide data to the context viewer system 138. More specifically, the data storage system 136 may provide data to the data aggregation logic 142. The data storage system 136 may receive appropriate data mapping instructions from the data mapping logic 144 and query the data system 116 to correlate the data from one mapped field in the dashboard tool to the mapped fields in the application data 146.

Embodiments of the dashboard display system 140 may be provided on the display computer system 114. In an example embodiment, the dashboard display system 140 may transfer data from various data sources or data from various applications to external data ranges of the graphic file and display the graphical interface during runtime operations. The dashboard display system 140 may include all of the features discussed above with regard to the dashboard design system 112. Also, the dashboard display system 140 also includes a dashboard execution logic 148 and external interface logic 150. The external interface logic 150 may have similar features as the external interface logic 124 of the dashboard design system 112. The external interface logic 150 may expose selected data ranges of the dashboard to the business software data. The external interface logic 150 may allow the business application software to export application data to be displayed in the dashboard in a visual format instead of a textual format. During runtime when displaying the dashboard in the business application, the dashboard execution logic 148 is configured to receive the data from the business application and generate a Flash Island interactive display as designed by the dashboard design system 112 or dashboard display system 140.

The data system 116 includes an application logic 152 and application data 146. The data system 116 may be configured to provide data and communicate with the display computer system 114. The application logic 152 is the server side of the application that provides back end information to the context viewer system 138. For example, the application logic 152 may comprise an Enterprise Resource Planning (ERP), Customer Relation Management (CRM) or Business Intelligence (BI) system. Business intelligence may refer to computer-based techniques used to analyze business data, such as sales revenue by products and/or departments or associated costs and incomes. The application data 146 may include relational or other types of databases. The application data 146 includes various fields that may be mapped to the fields exposed by the external dashboard interface.

Figure 12:
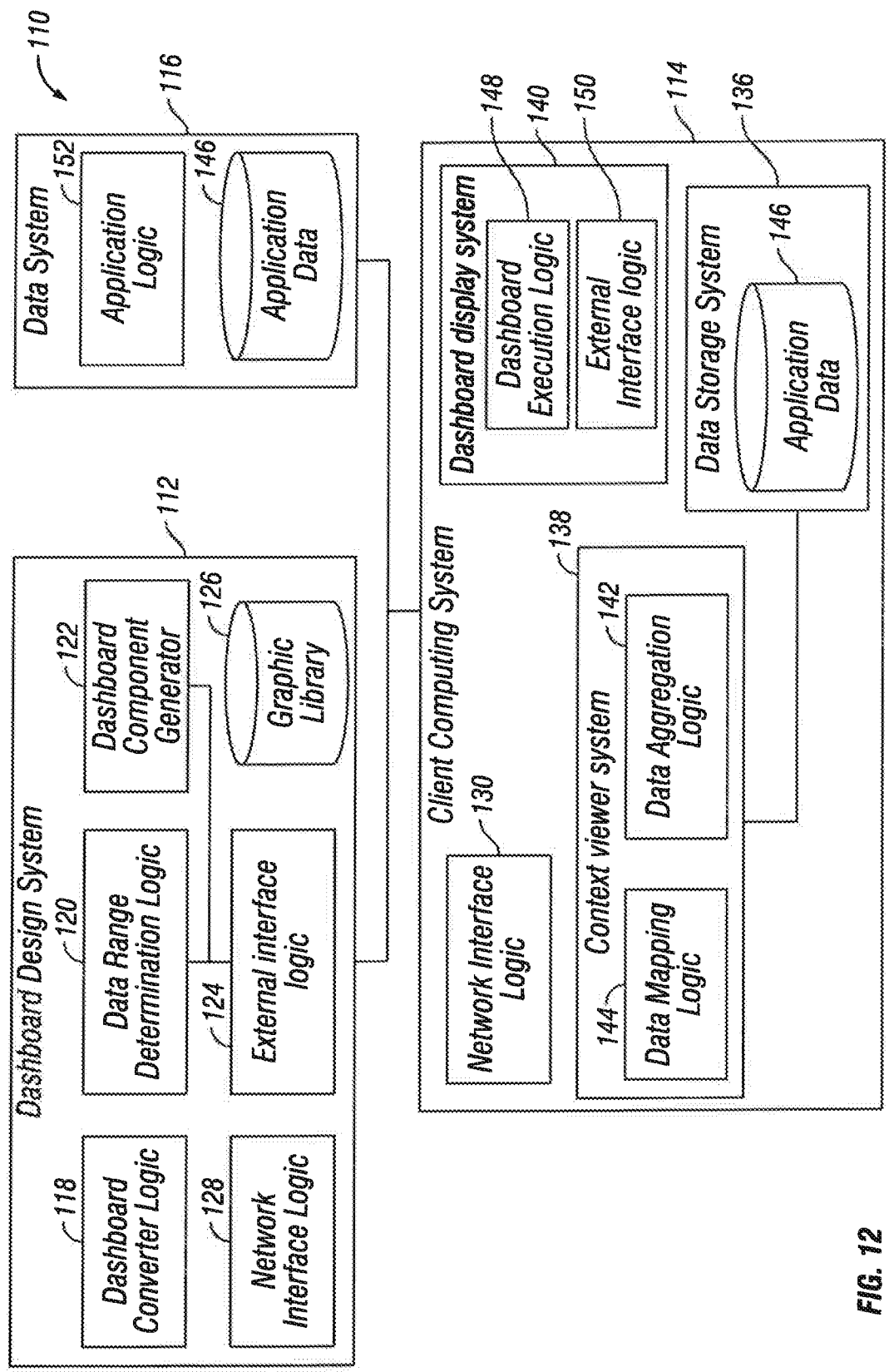
FIG. 12 is a schematic diagram of a processing system according to an embodiment.
Figure 13:
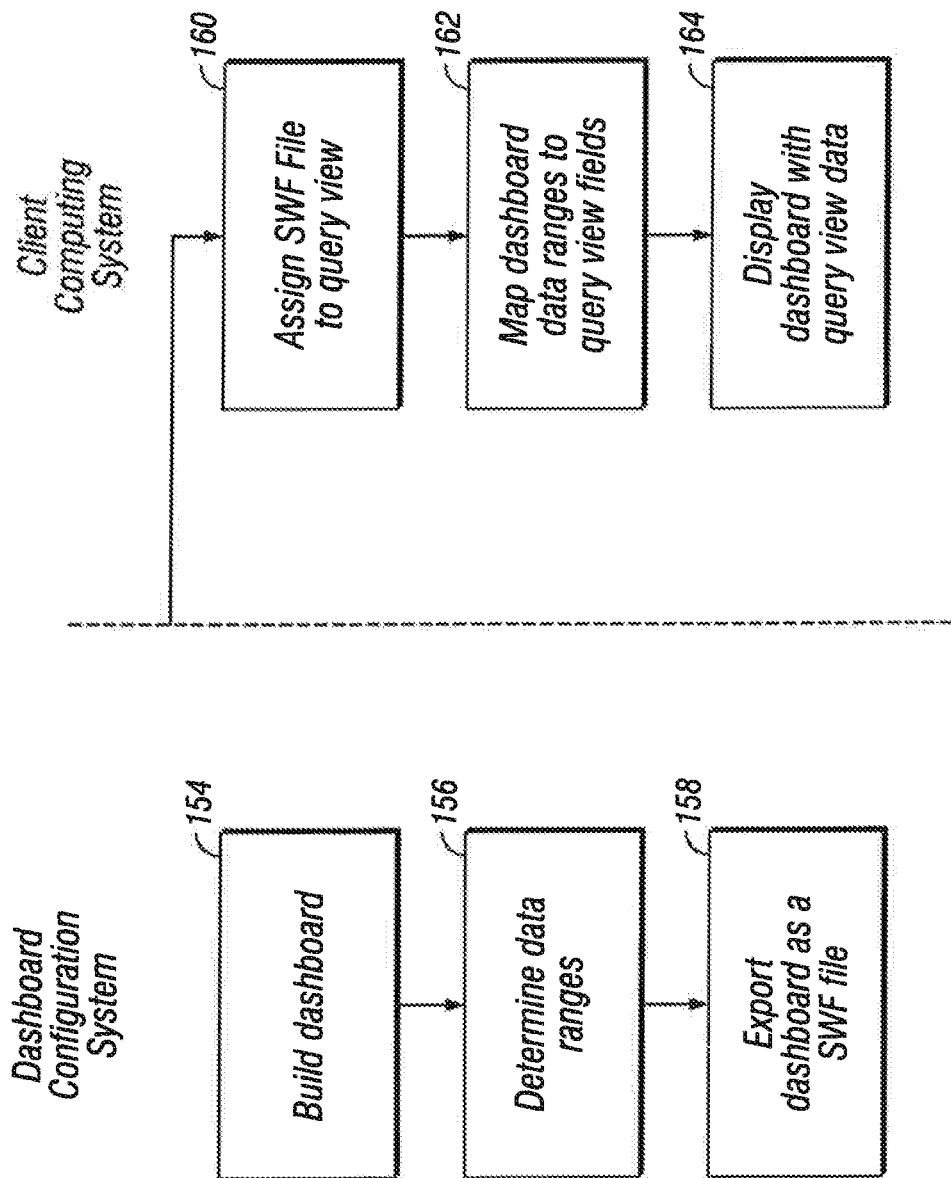
FIG. 13 is an example process that may be implemented using the systems shown in FIG. 1.

FIG. 13 is an example process that may be implemented using the system shown in FIG. 12. Initially, at step 154, in an example embodiment a dashboard design user may build a dashboard using a dashboard building software. The dashboard design user may configure the dashboard during design time. In an example embodiment, design time may include the design user configuring the dashboard layout and exposing a related data range. The dashboard design system 112 may be used to create a dashboard layout. Building the dashboard includes placing components on the canvas and configuring the properties associated with those components. As discussed above, the components may be among other components, a chart or graph. At step 156, the dashboard design user may determine and specify using a graphical user interface the data ranges for the dashboard. After creating the dashboard, at step 158, the dashboard may be exported automatically or by input from the dashboard design user to a SWF file format. Steps 154, 156 and 158 may be performed by the dashboard design user using the dashboard configuration system 112.

A business user may perform the other steps of FIG. 13 by using the display computer system 114. In an example embodiment, the business user's steps may be performed during runtime. In this embodiment, runtime includes displaying of the dashboard in a business application using data from business application data sources. In another embodiment, the business user may perform the steps described above with regard to the dashboard design user. At step 160, the business user may open the context viewer system where the business user may select a chart view 198 as shown in FIG. 17. In the chart view tab, the business user may assign the dashboard or SWF® file to a query view by specifying the location of the file. At step 162, the dashboard data ranges that were determined at step 156 may be mapped to query view fields. In an example embodiment, the data from the data source 136 (or 116) is placed in the mapped location in the dashboard. In another example embodiment, the mapping between application data and graphical interface data may identify which application data may be shown in the reserved placeholder of the dashboard. After mapping the data ranges, at step 164 the dashboard may be displayed in the business application. In one embodiment the business application may be software applications that provide various functionalities such as, customer relationship management, enterprise resource management, product lifecycle management, supply chain management and supplier relationship management. In another embodiment, the dashboard may be configured to receive data from the data system 116 after the mapping has occurred or the data may be accessed during runtime.

Figure 14:
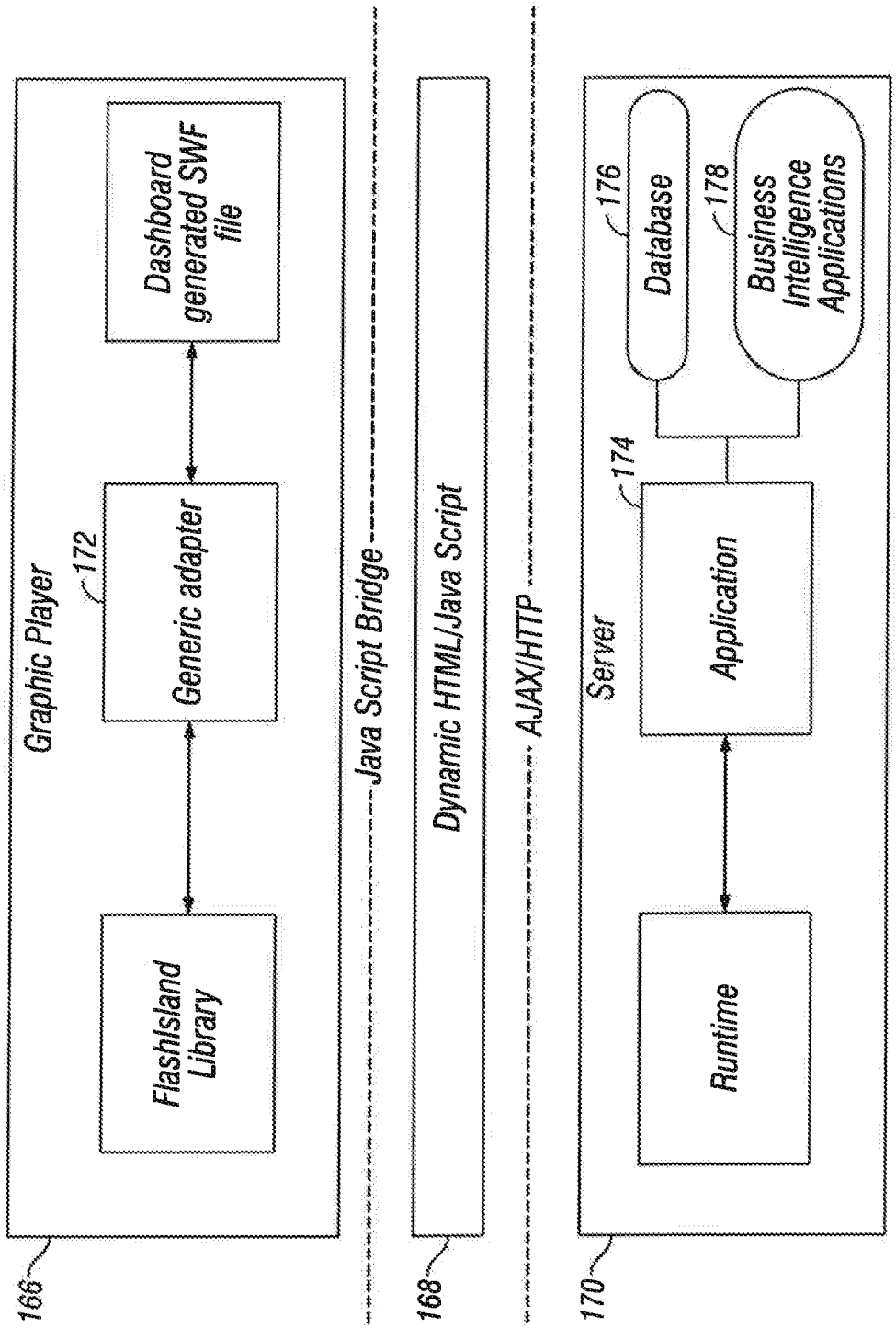
FIG. 14 is an example software architecture diagram that may be implemented using the systems shown in FIG. 1.

FIG. 14 is an example software architecture that may be implemented using the system in FIG. 12. The software architecture diagram shown in FIG. 14, shows various software layers, such as, graphic player 166, component Dynamic HTML or Java® Script 168, and Server (Java® or Java® based or other high-level programming language based) 170 layers. In particular, the generic adapter 172 may be built with the Flash Island library, which may facilitate the client-side communication between HTML and JavaScript® The Dynamic HTML 168 may load the generated dashboard in a graphic file, or Flash/SWF representation. The generic adapter 172 may convert the Java® context into structures that match the dashboard's external interface format or the dashboard format. The generic adapter 172 allows the business user to generate a dashboard in a business analytic software using the most updated data from a data source without writing any customized software. The generic adapter 172 may load dashboard data ranges and convert the associated data into an XML® string that may be used for further conversion into an ABAP® string, which may be used by the business analytic software.

In another embodiment, the generic adapter 172 may convert the Flash Island properties into dashboard structures. In an example embodiment, the generic adapter 172 may be used to load external dashboard ranges during the configuration stage, at step 162. In this embodiment, the generic adapter 172 may push application data to the data ranges defined in step 162. In another embodiment, the generic adapter 172 may provide an application programming interface between the graphic player 166 and the server 170. The generic adapter 172 may load dashboard ranges automatically and the dashboard data ranges may be converted into XML strings. The XML string may be converted into Java® or ABAP® code which may be executed by the business application 174, to display a dashboard. The server 170 may include NetWeaver®, ABAP® or Java® language programming and the server may include various systems that are supported in the business software suit, the runtime 382, application 174, database 176 and business intelligence application 178. In another embodiment, the functionality of the server 170 may be implemented by the display computing system 114. In yet another embodiment the functionality of server 170 may be divided between the display computing system 114 and data system 116. In another embodiment, the graphic player 166 may be implemented on the dashboard design system 112. Additionally, or alternatively, the functionality of the graphic player 166 may be implemented on the display computing system 114.

Figure 15:
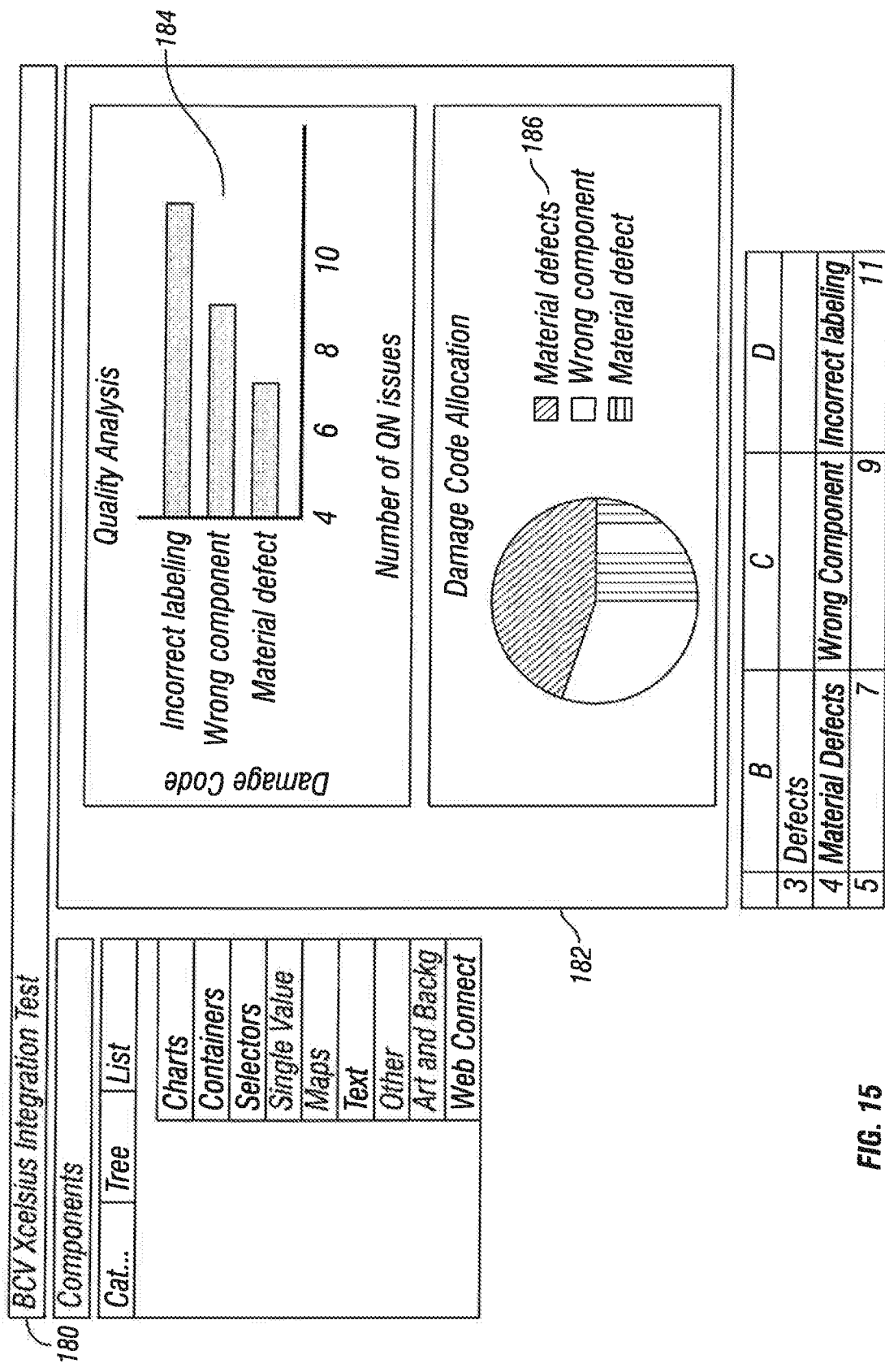
FIG. 15 is a screen display of a dashboard display system that may be used to configure a dashboard.

FIG. 15 shows a screen display 180 of the dashboard designer that may be used to design a dashboard display according to the system shown in FIG. 12. The dashboard designer may be executed by the dashboard design system 112. The dashboard may be created on the canvas 182. A dashboard design user may place the components from the component panel on the canvas 182. As shown in FIG. 15, the canvas 182 has a bar graph 184 and a pie chart 186 that are displayed in this example dashboard. The dashboard 180 shown in FIG. 15 is using example data from the spreadsheet shown at the bottom of FIG. 15. For example, the labels of the bar graph "Incorrect labeling", "Wrong component" and "Material defects" are from the spreadsheet shown below. In particular, the cell range from B4 to D5 440 was selected as input into the properties of the bar graph and the pie chart.

Next, the data in the bar graph and the pie chart is received from cell range B5 to D5. In order to generate this dashboard, the dashboard design user may associate various data fields with particular component properties.

Figure 16:
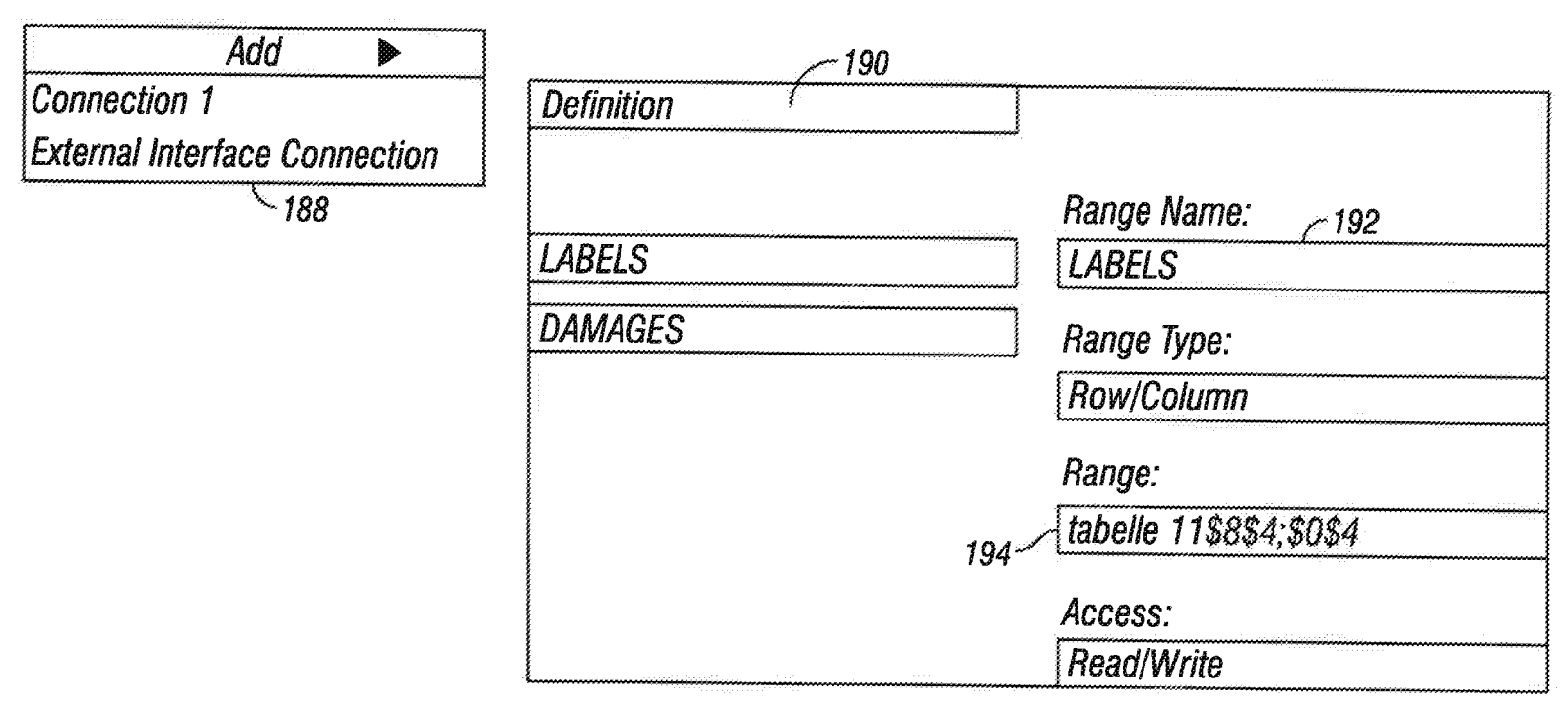

FIG. 16 is a screen display of the dashboard external interface that can permit another software program to access the dashboard controls and display. The external interface connection 188 may allow data from the application system to be passed to a cell range of the dashboard or SWF file, using push technology. During the execution of the dashboard or runtime, data may be pushed or sent from the data source, based on the mapping, to the dashboard. In this embodiment, the data may be transferred in tabular form across an interface. In another embodiment the external interface connection 188 may allow the use of pull technology, where the data is pulled by the context viewer system 138. In another embodiment, during the configuration of the dashboard when the "Generate XC Fields" button is clicked, the defined data ranges will be pulled to the system 150, for example in FIG. 16. The external interface connection 188 may be configured using a definition tab 190, range name 192, range type, range 194 and access type properties. External interface connections allow a dashboard design user to expose selected data ranges relating to the dashboard display. The range name 192 in FIG. 16 is shown as Labels and the range 194 being assigned, "Table 1 !$B$4:$D$4" which is the cell range from B4 to D4. In this example embodiment, the labels from B4 to D4 will be used for mapping the Labels field. After specifying the data range, the dashboard design user may export the dashboard as a file, the file may be executed by various software program including business software.

FIG. 17 is a screen display that allows a user to choose a chart view in order to display a dashboard. In particular, the query view 196 is part of the context viewer application and includes various data types from a business analytics database. If the user chooses to view a chart, the user may select the chart view 198. After a user selects the chart view 198 then the user may be presented with a screen shown in FIG. 18.

FIG. 18 is an example screen display showing the data mapping for the dashboard configuration screen. Screen 210 shows a user interface where the user may select (using a pull-down menu) the type of technology 212 the user plans to use for the chart view display. Here, the user may select the type of dashboard file that was created as the technology. Next, the file path 214 of the exported dashboard or SWF file may be specified. After choosing a SWF file, the user may select the "Upload file to repository" button 730 in order to save a graphic file (SWF file) in the system 138. After selecting button 740 "Generate XC Fields", may be the name of the dashboard external data ranges (e.g. "Damages" and "Labels" in FIG. 16). In the mapping shown in FIG. 18, the user may enter or browse for the name of data source (Query ID). For example, the Query ID shown in this example is "ZOK_QN". This entry is mapped against the data source that may be stored in the application data 146. The user may search for the Query Field ID, which is a specific field of data source Query ID (e.g. field "CODE TEXT" of Query ID "ZOK_QN" in the provided example). Creating this mapping allows the dashboard to utilize the data in the application data 146 or 130. As can be appreciated that programming in a textual or visual manner is not required and the user may create the dashboard, export the dashboard, map the fields and display the dashboard as shown in FIG. 19 using a graphical user interface that responds to a pointing device (e.g. mouse, pen or display device that is sensitive to touch or ocular movement).

Figure 19:
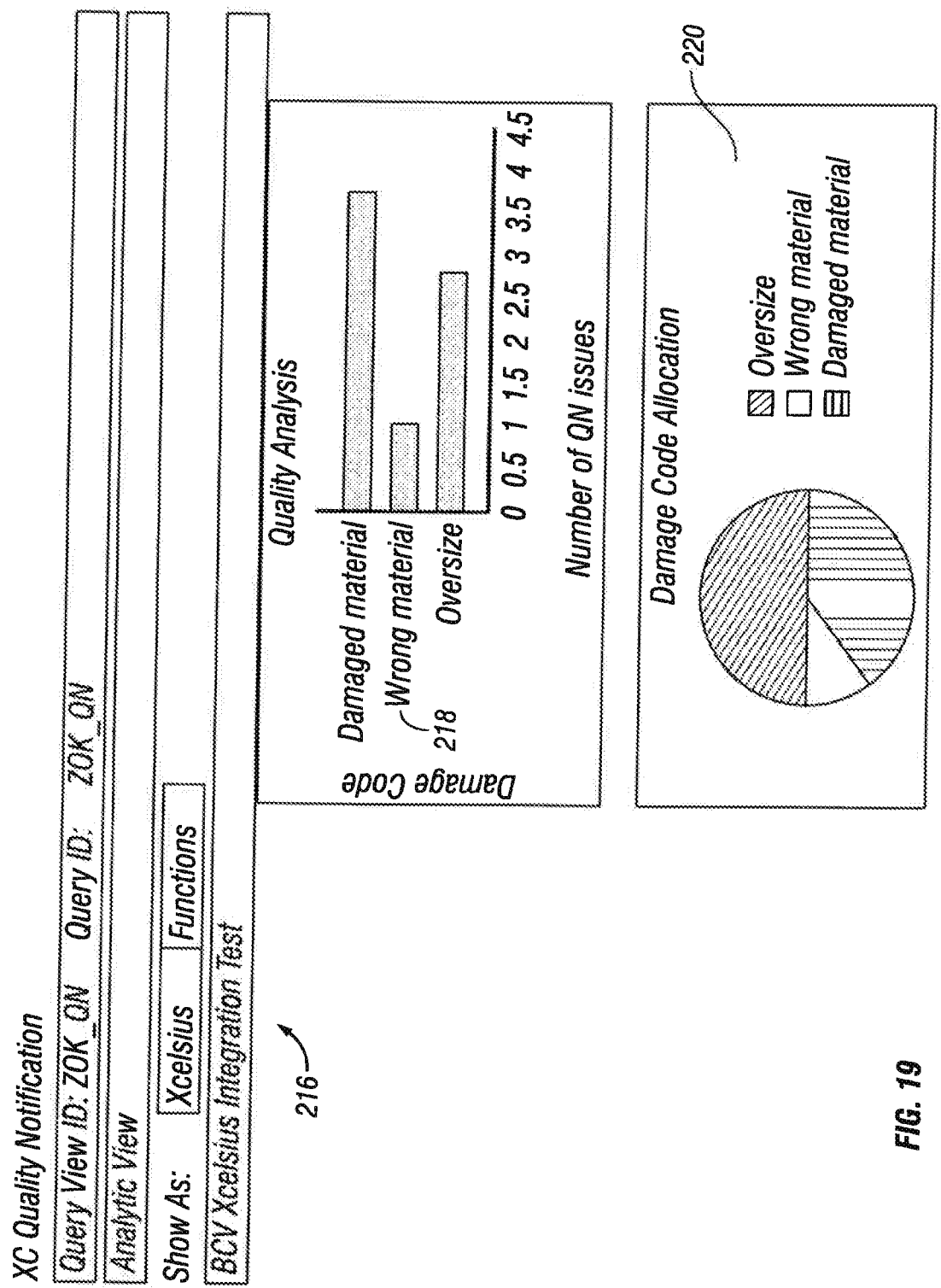
FIG. 19 is an example screen display showing the graphical display of the data using the dashboard configuration shown in FIGS. 4-7.

FIG. 19 is an example screen display showing the graphical display of the data using the dashboard configuration from FIGS. 15-18. FIG. 19 shows a dashboard 216 that includes the bar graph 218 and pie chart 220. The labels and the value data in the bar and the pie charts 218 and 220 are from the business software and are different than the data used in FIG. 15. Therefore, the user can create a display of a dashboard in another application by using an external connection that may expose data fields to permit the visualization of any type of data.

The embodiments refer to a dashboard that may be a web-based or other technology-based display on which real time data is collated, processed and displayed from multiple data sources that belong to one or more businesses. Other terms that may be used to describe a dashboard, include, digital dashboard, enterprise dashboard, business dashboard, executive dashboard, operational dashboard, BI dashboard, database dashboard, Web dashboard, performance dashboard, score card, KPI dashboard, metrics dashboard and so on. Dashboards may be designed to help any user monitor what's happening or has happened in the past visually or at a glance. Dashboards may provide the user a means to rapidly monitor the current status. Accordingly, dashboards must be designed to take advantage of the strengths of visual perception, cognition and work around or augment the user's weaknesses.

Embodiments can include a system for displaying data stored on computer readable non-transitory media. The system configured to access one or more data fields within a file. The file having been configured using an external connection adapter. The system may include a display computer system configured to map the accessed one or more data fields to data from one or more data sources, the mapping being performed based on a user input via a graphical user interface. In this embodiment, the system may be configured to display on the display computer system a dashboard according to the configuration setting stored in the file, the dashboard may show a graphical representation of the data from the one or more data sources and information from the one or more data fields.

In another embodiment, the dashboard includes dashboard display system that processes the data from the one or more data sources and displays a visual representation of the data in a graph or chart form. Alternatively, or additionally, the dashboard includes a component that is modified by using a graphical user interface such that the dashboard display or components are modified.

In another embodiment, the file is generated by a first software program located in the dashboard design system that is configured to generate the dashboard. The display computing system may further comprise executing a second software program on the display computer system to retrieve the data from the one or more data sources and displaying the dashboard. The display computing system may include converting, using a generic adapter, the data from the one or more data sources into data structures that are compatible with a format of the graphic file.

In another embodiment the data is converted from the one or more data sources into data structures that are compatible with a format of the file using the external connection adapter. The file can be a short web format file that exposes one or more data fields that may be mapped to fields in one or more data sources. In another embodiment, the mapping may occur via a graphical user interface free of receiving textual programming code from the user.

In another embodiment, a computer-implemented method is stored on a computer readable media. Visualization software is integrated with a data processing application that includes configuring a dashboard display using a dashboard design system. The dashboard display can use one or more first data ranges from a spreadsheet as example data. An external connection adapter can be used to provide access to one or more first data ranges that are to be displayed in the dashboard display.

In other embodiments, the dashboard display is exported in a graphic file format. In certain embodiments, one or more first data ranges are accessed from the dashboard display using a display computing system. In one embodiment, one or more first data ranges are connected to one or more second data ranges from one or more data sources. The dashboard can display using data from the one or more second data ranges.

In one embodiment, the dashboard displays with the problem walls from clustering messages received from infrastructure 14 data can use a graphical user interface that is free from receiving textual or textual programming code from the client. In this embodiment the method may include processing place problem walls from clustering messages received from managed infrastructure 14 from the one or more data sources and displaying a visual representation of the data in a graph or chart form. This can include a method that includes a component that may be modified by using a graphical user interface that results in a modification of the dashboard display.

In one embodiment, a method is provided that includes a dashboard display generated by a first software program that generates a visual display. This can include, executing a second software program on the display computer system to retrieve the data from the one or more data sources and displaying the dashboard and the method may include converting, using a generic adapter, the data from the one or more data sources into data structures that are compatible with a format of the file.

In one embodiment, the exporting can include converting the place problem walls from clustering messages received from infrastructure 14 data from the one or more second data sources into data structures that are compatible with the graphic file format. In one embodiment, this can include converting using an external interface adapter. A graphic file format can be a short web format that allows a software to access the one or more first data ranges.

In another embodiment, a user interface system has an external connection adapter configured to provide access to one or more data fields within a file. As a non-limiting example, this can include a display computer system that maps using a graphical user interface the one or more data fields to data from one or more data sources. The display computer system can generate a dashboard display from a configuration in the file. In one embodiment, the display includes place problem walls from clustering messages received from infrastructure 14 data from one or more data sources and information from one or more data fields. A graphical user interface can be provided that is free of receiving textual programming code from the user.

In one embodiment, a first software executed on a display computer system that generates the dashboard in a visual graphic display. A second software program can be included to execute on the display computer system and retrieve the data from the one or more data sources and display the dashboard display. A generic adapter can be utilized to convert the data from the one or more data sources into one or more data structures that are compatible with a format of the file.

In one embodiment, a graphical user interface can modify a component and this can be used to modify the dashboard display.

In one embodiment, an external connection adapter converts the data from the one or more data sources into data structures that are compatible with a format of the file using the external connection adapter.

The logics can be machine-readable media for carrying or have machine-executable instructions or data structures stored thereon. The machine-readable media can be any available media that may be accessed by a general purpose or special purpose computer or other machine with a processor. As a non-limiting example, a variety of machine-readable media can be utilized, including but not limited to: RAM, ROM, EPROM, EEPROM, CD-ROM or other optical disk storage, magnetic disk storage or other magnetic storage devices, non-transitory computer readable media or non-transmissible computer-readable media or any other medium which may be used to carry or store desired program code in the form of machine-executable instructions or data structures and which may be accessed by a general purpose or special purpose computer or other machine with a processor. With the dashboard system, any such type of connection is termed a machine-readable medium. It will be appreciated that the machine-readable medium can include combinations of the preceding.

As non-limiting examples, with the dashboard system, machine-executable instructions can be: instructions and data which cause a general-purpose computer, special purpose computer, or special purpose processing machines to perform a certain function or group of functions, and the like.

The dashboard system can be implemented by a program product including machine-executable instructions, such as program code. As a non-limiting example, this can be program modules executed by machines in networked environments. As non-limiting examples, the program modules can include routines, programs, objects, components, data structures, and the like, that perform particular tasks or implement particular abstract data types. As non-limiting examples the dashboard system can utilize, machine-executable instructions, associated data structures, and program modules as program code for executing steps of the methods disclosed herein.

As non-limiting examples, the dashboard system can be executed in a networked environment using logical connections to one or more remote computers having processors. AS non-limiting examples, suitable network computing environments can be, computers, including personal computers, mobile devices, multi-processor systems, microprocessor-based or programmable consumer electronics, network PCs, minicomputers, mainframe computers, and the like.

In certain embodiments, the dashboard system can be executed in distributed computing environments where tasks are performed by local and remote processing devices that are linked. As non-limiting examples, the linking can be by, hardwired links, wireless links, combination of hardwired or wireless links, and the like, through a communications network. In one embodiment, computing environment, program modules may be located in both local and remote memory storage devices.

As a non-limiting example, one embodiment of a system for implementing the overall system or portions of the embodiments can include a general-purpose computing computer in the form of computers, including a processing unit, a system memory or database, and a system bus that couples various system components including the system memory to the processing unit. The database or system memory cam include read only memory (ROM) and random-access memory (RAM).

As a non-limiting example, the database can be a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media, and the like.

As a non-limiting example, the drives and their associated machine-readable media can be used to provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

Figure 20:
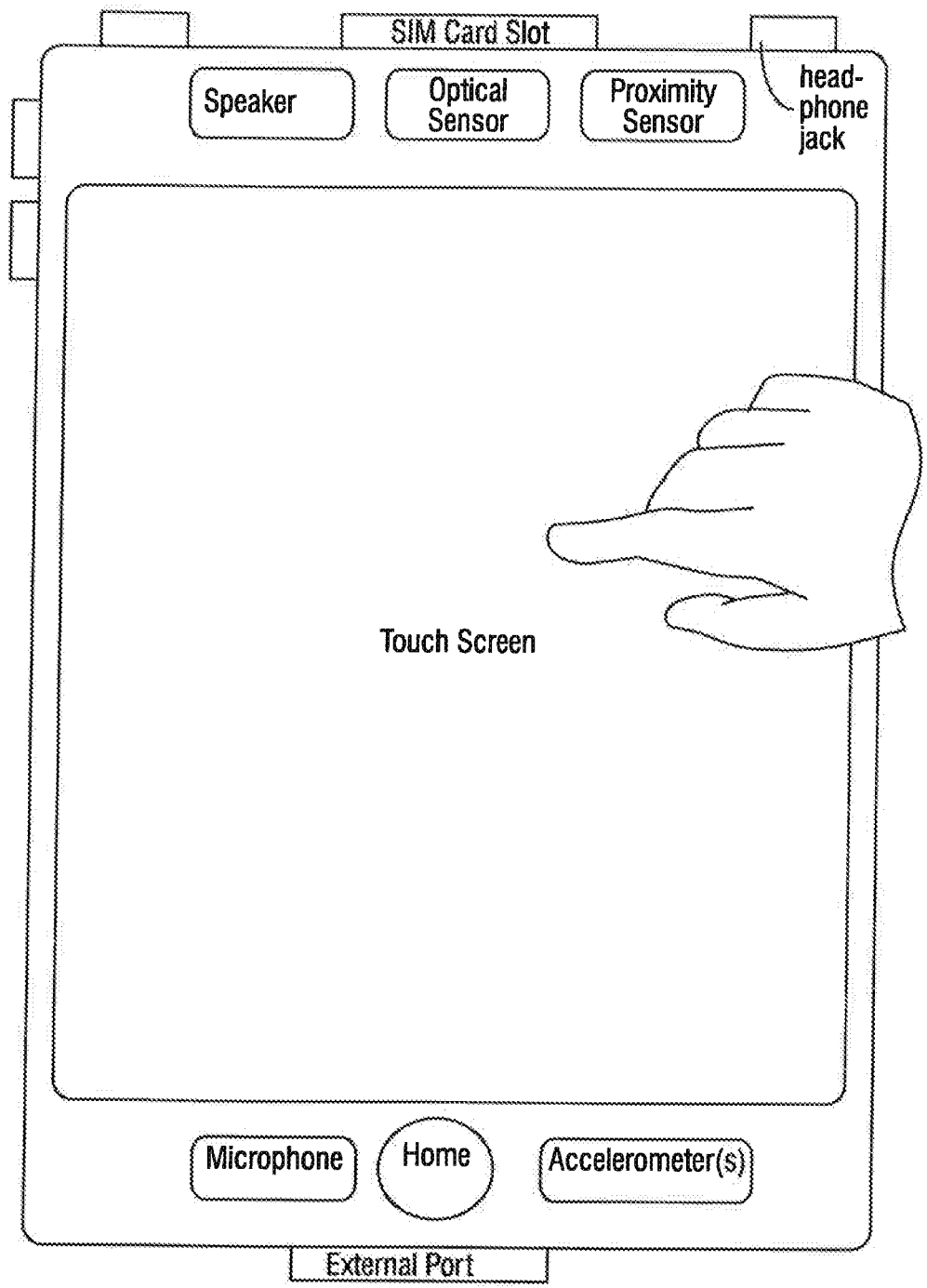
FIGS. 20 through 22 illustrate one embodiment of a mobile device infrastructure that can be used with the clustering system of the present invention.
Figure 21:
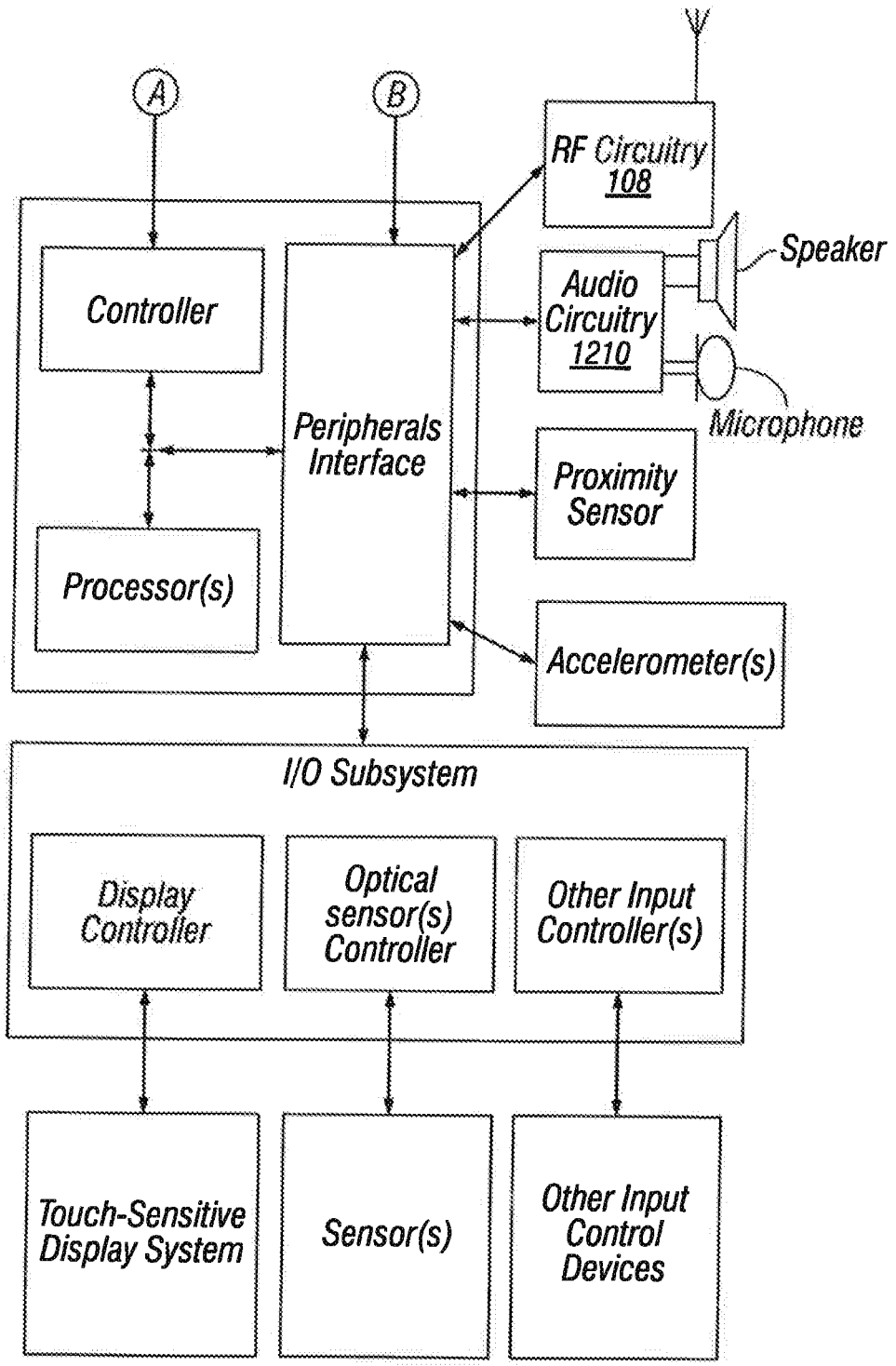
Figure 22:
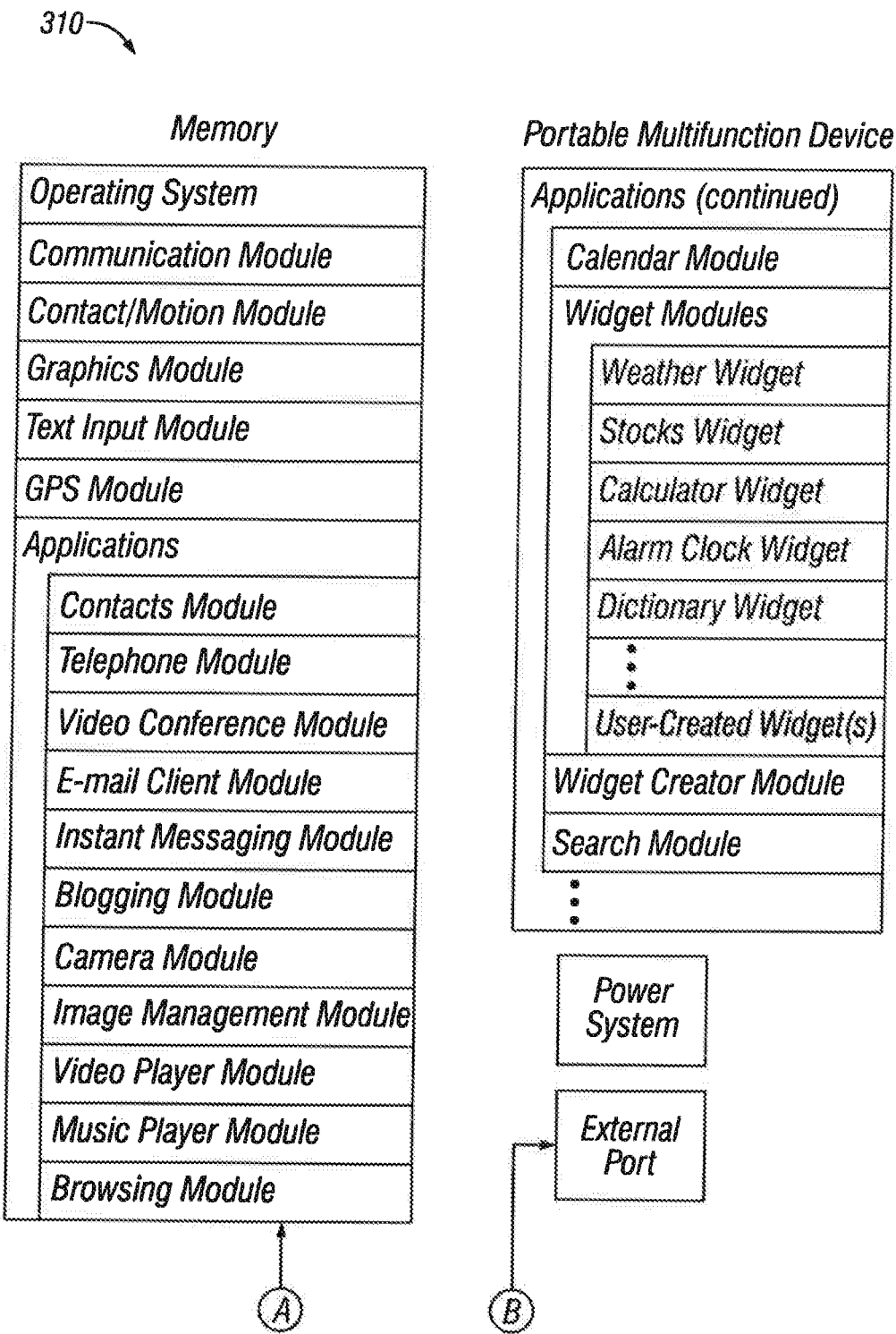

Referring now to FIGS. 20 through 22, diagrams are provided illustrating embodiments of a mobile or computing device that can be used as infrastructure 14 with system 10.

Referring to FIGS. 20-22, the mobile or computing device can include a display that can be a touch sensitive display. The touch-sensitive display is sometimes called a "touch screen" for convenience, and may also be known as or called a touch-sensitive display system. The mobile or computing device may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. The mobile or computing device may include one or more optical sensors. These components may communicate over one or more communication buses or signal lines.

It should be appreciated that the mobile or computing device is only one example of a portable multifunction mobile or computing device, and that the mobile or computing device may have more or fewer components than shown, may combine two or more components, or a may have a different configuration or arrangement of the components. The various components shown in FIG. 21 may be implemented in hardware, software or a combination of hardware and software, including one or more signal processing and/or application specific integrated circuits.

Memory may include high-speed random-access memory and may also include non-volatile memory, such as one or more magnetic disk storage devices, flash memory devices, or other non-volatile solid-state memory devices. Access to memory by other components of the mobile or computing device, such as the CPU and the peripherals interface, may be controlled by the memory controller.

The peripherals interface couples the input and output peripherals of the device to the CPU and memory. The one or more processors run or execute various software programs and/or sets of instructions stored in memory to perform various functions for the mobile or computing device and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications networks and other communications devices via the electromagnetic signals. The Network Systems circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a user and the mobile or computing device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. In some embodiments, the audio circuitry also includes a headset jack (FIG. 20). The headset jack provides an interface between the audio circuitry and removable audio input/output peripherals, such as output-only headphones or a headset with both output (e.g., a headphone for one or both ears) and input (e.g., a microphone).

The I/O subsystem couples input/output peripherals on the mobile or computing device, such as the touch screen and other input/control devices, to the peripherals interface. The I/O subsystem may include a display controller and one or more input controllers for other input or control devices. The one or more input controllers 1 receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port, USB port, and a pointer device such as a mouse. The one or more buttons may include an up/down button for volume control of the speaker and/or the microphone. The one or more buttons may include a push button. A quick press of the push button may disengage a lock of the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device on or off. The user may be able to customize a functionality of one or more of the buttons. The touch screen is used to implement virtual or soft buttons and one or more soft keyboards.

The touch-sensitive touch screen provides an input interface and an output interface between the device and a user. The display controller receives and/or sends electrical signals from/to the touch screen. The touch screen displays visual output to the user. The visual output may include graphics, text, icons, video, and any combination thereof (collectively termed "graphics"). In some embodiments, some or all of the visual output may correspond to user-interface objects, further details of which are described below.

A touch screen has a touch-sensitive surface, sensor or set of sensors that accepts input from the user based on haptic and/or tactile contact. The touch screen and the display controller (along with any associated modules and/or sets of instructions in memory) detect contact (and any movement or breaking of the contact) on the touch screen and converts the detected contact into interaction with user-interface objects (e.g., one or more soft keys, icons, web pages or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile or computing device, whereas touch sensitive tablets do not provide visual output.

A touch-sensitive display in some embodiments of the touch screen may be as described in the following applications: (1) U.S. patent application Ser. No. 11/381,313, "Multipoint Touch Surface Controller," filed May 12, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser.

No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen may have a resolution in excess of 1000 dpi. In an exemplary embodiment, the touch screen has a resolution of approximately 1060 dpi. The user may contact the touch screen using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the mobile or computing device may include a physical or virtual click wheel as an input control device. A user may navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Figure 30:
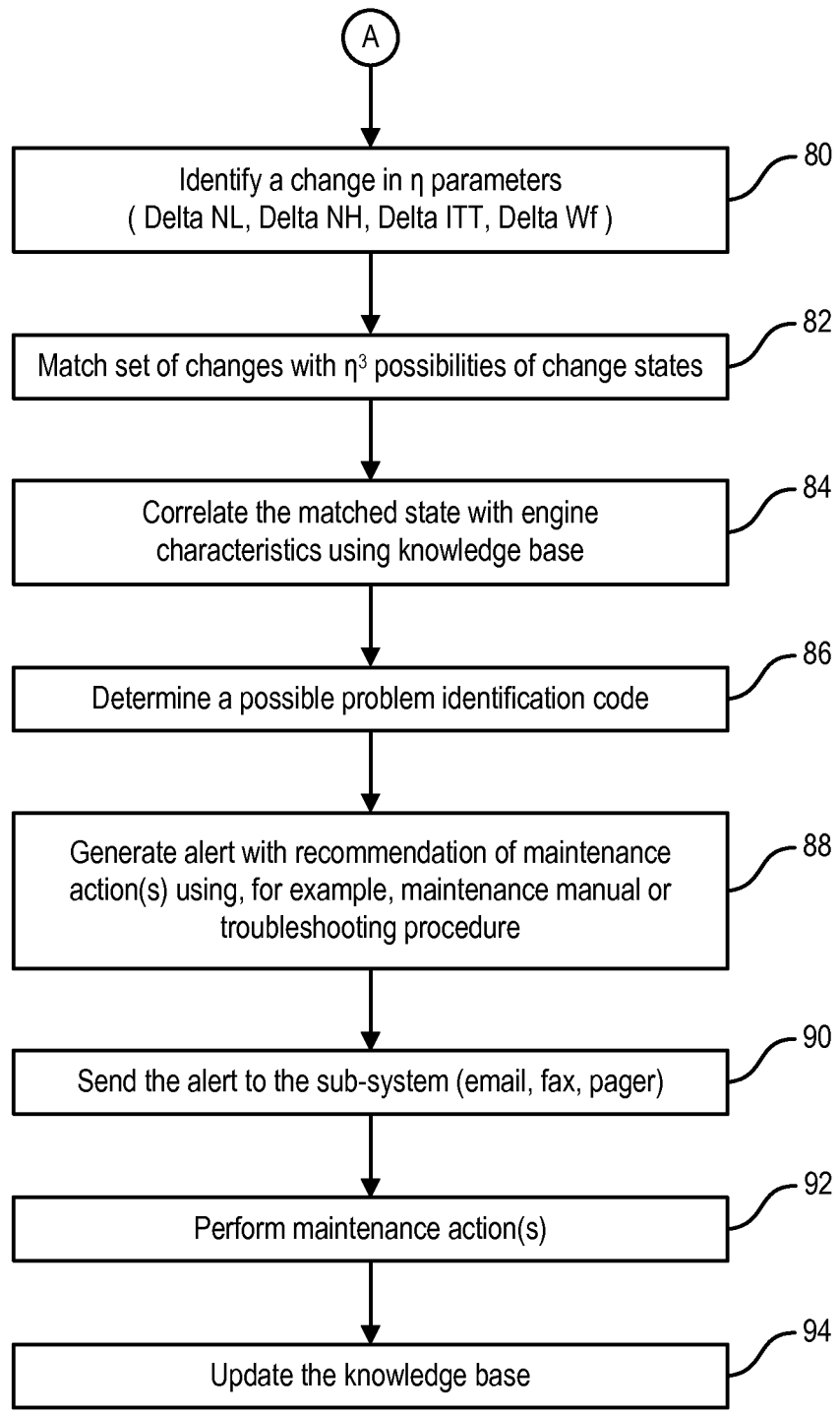
FIG. 30 is a flow chart of a data analysis technique for use in the method of FIG. 27.

The mobile or computing device may also include one or more sensors, including not limited to optical sensors. FIG. 30 illustrates how an optical sensor coupled to an optical sensor controller in I/O subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module 58 (also called a camera module); the optical sensor may capture still images or video. In some embodiments, an optical sensor is located on the back of the mobile or computing device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

The mobile or computing device may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 13/096,386, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detect contact on a click wheel.

Examples of other applications that may be stored in memory include other word processing applications, JAVA-enabled applications, encryption, digital rights management, voice recognition, and voice replication.

In conjunction with touch screen, display controller, contact module, graphics module, and text input module, a contacts module may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

Figure 23:
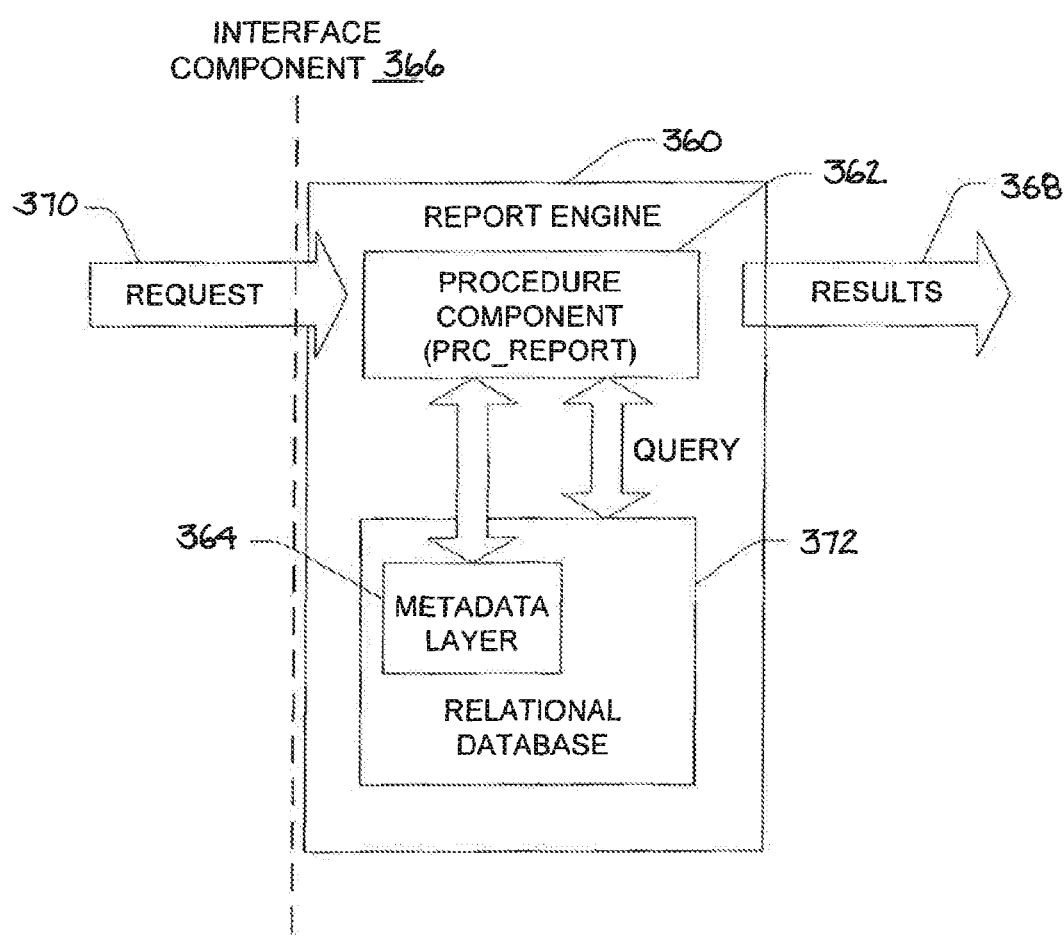
FIG. 23 is a block diagram illustrating a reporting engine in one embodiment of the present invention.

FIG. 23 illustrates a reporting engine 360 in block diagram form that is coupled to system 10. The reporting engine generates reports from the clustered clustering events and/or messages. In one embodiment, the report engine 360 is coupled to the situation room 18.

In one embodiment, computer-executable instructions implement the reporting engine 360. In one embodiment, the instructions include a predefined procedure component 362, a metadata component, or layer, 364, and an interface component 366 illustrated in FIG. 24.

Reporting engine 360 generates a report at 368 from the clustered events and/or messages which can be retrieved from situation room 18. In one embodiment, the reporting engine 360 is in communication with one or more dashboards associated with the situation room and retrieves information therefrom in response to a request received at 370 for selected information that is used to generate a report.

As non-limiting examples, reports can include but are not limited to, graphical using charts/tables, and the like on a display screen and printed in tabulated and graphical form; inter-alia: composite metrics that can include:

system or infrastructure components health; operator efficiency (average time taken to detect and resolve incident as described by a cluster); detail on a monitored incident; USR interactive reports; SCA (service legal agreement) compliance, and the like.

In one embodiment, the clustered events/messages are in a database 372 illustrated in FIG. 23. The metadata layer 364 can be maintained separately or together with the data to be searched in database 372.

In one embodiment, queries regarding the clustered events/messages are answered through reports generated from, as a non-limiting example, structured query language (SQL) statements that need to be heavily customized as new report requirements arise. Those skilled in the art are familiar with the use of SQL statements or strings to define SQL commands typically used in queries and aggregate functions.

In one embodiment, reporting engine 360 has three main parts, i.e., the metadata layer 364, the interface 366 embodying simplified query syntax, and the procedure component 362.

As an example, database 372 represents an exemplary data warehouse containing the clustered events/messages. The clustered events/messages can have several dimensions.

As a non-limiting example, a procedure component 362, shown in FIG. 23 by a predefined, stored procedure, prc_report, reporting engine 360 returns a result set at 368 that matches the user-specified format and search conditions, as indicated at 370.

In one embodiment, the metadata in metadata layer 364 describes the clustered events/messages that can be in database 372 or accessed via a dashboard directly according to one or more of its characteristics, such as its data type. As a non-limiting example, metadata layer 364 can include entities and SQL view describing the related dimensions, attributes, measures, and/or facts relative to the clustered events/messages.

As a non-limiting example, an attribute can be a descriptive characteristic of one or more levels representing logical groupings that enable end users to select information based on like characteristics. An attribute can be a column or row in a dimension that characterizes elements of a single level. A measure can be a numeric value stored in a fact table or cube.

As a non-limiting example, to extract information out of system 10, including database 372, procedure component 362 first accepts inputs from the user at 370 according to the query syntax of interface 366. In turn, procedure component 362 takes the inputs, matches them with metadata layer 364, and constructs a set of SQL statements to retrieve information from the clusters. When reporting engine 360 receives a request for information to be retrieved it uses the metadata. Procedure component 362 then constructs a query (e.g., one or more SQL statements) based on the fact table's SQL view, runs the query, and returns the result in the form of a report.

Figure 24:
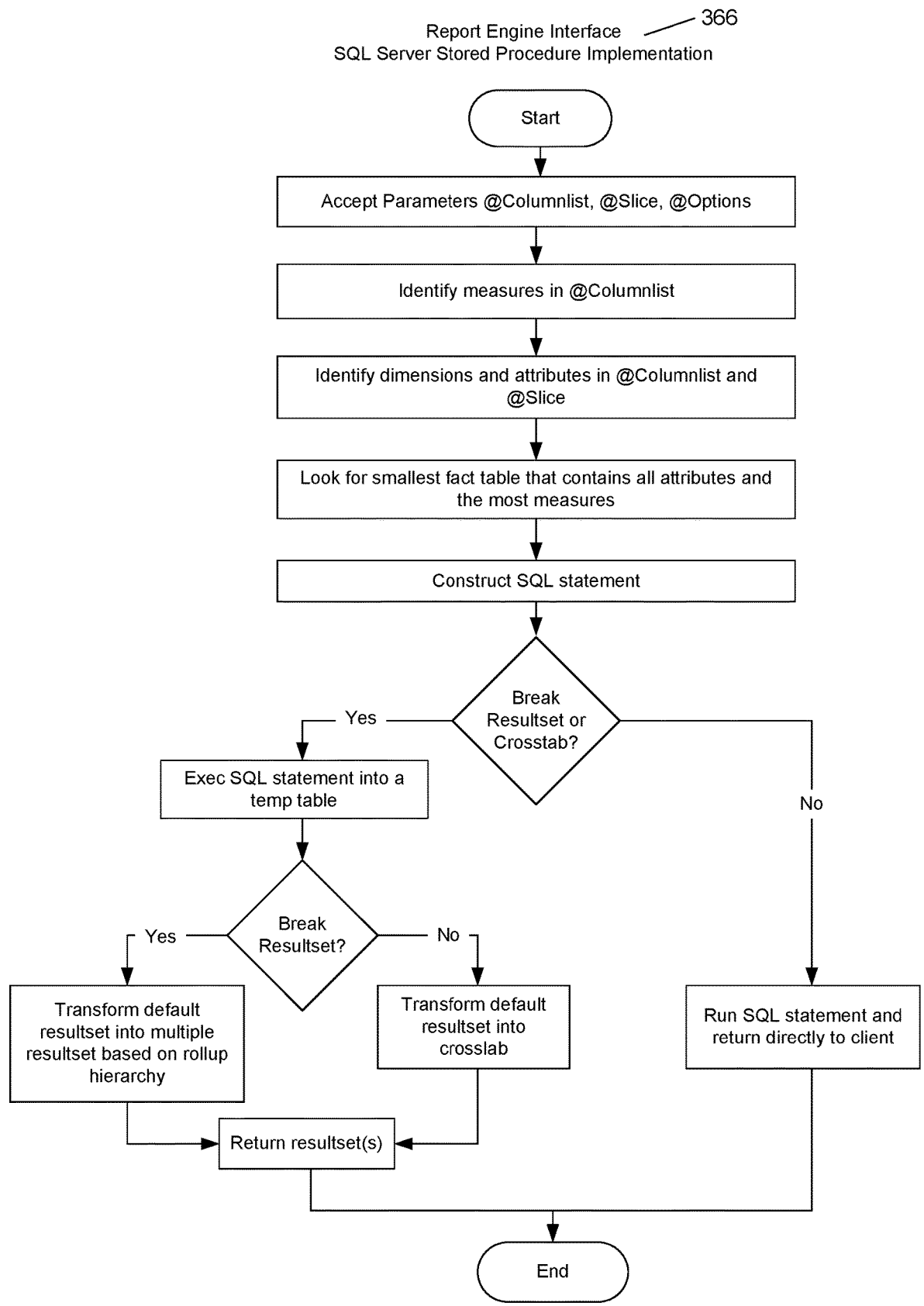
FIG. 24 illustrates one embodiment of a flow diagram relative to a reporting engine such as the one shown in FIG. 23.

Referring now to FIG. 24, an exemplary flow diagram illustrates aspects of reporting engine 360 including interface component 366.

Figure 25:
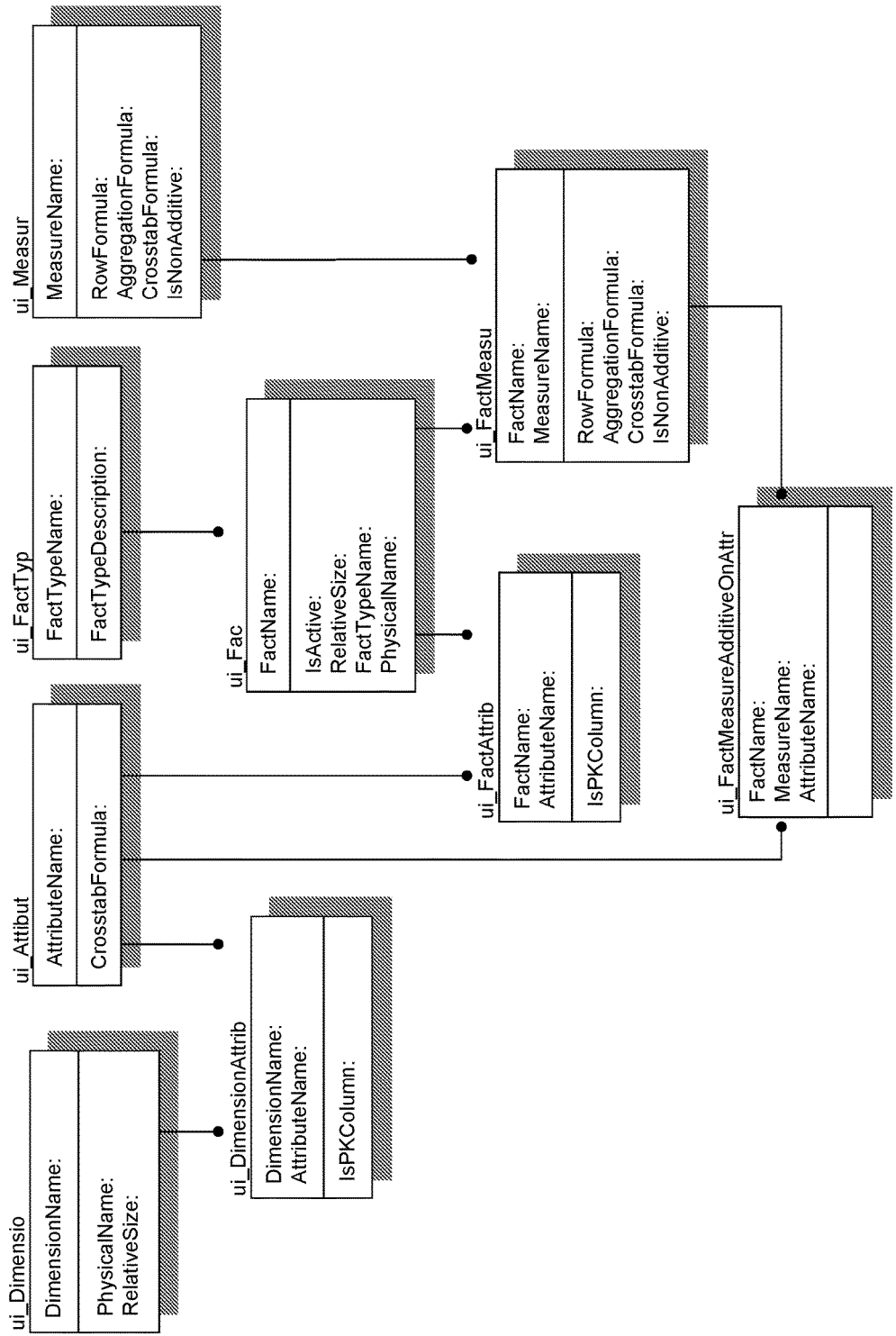
FIG. 25 illustrates in a block diagram one embodiment of reporting engine metadata that can be used with the present invention.

FIG. 25 is a block diagram illustrating an exemplary reporting engine metadata reporting framework.

In one embodiment, event clustering system 10 includes a processor. An extraction engine 12 is in communication with an infrastructure 14. The extraction engine 12 receives data from the infrastructure 14. A signalizer engine 22 includes one or more of an NMF engine 24, a k-means clustering engine 26 and a topology proximity engine 28. The signalizer engine 22 determines one or more common steps from events and produces clusters relating to the alerts and or events. In response to production of the clusters one or more physical changes are made in a managed infrastructure hardware. Multi-systems interact with each other.

Figure 26:
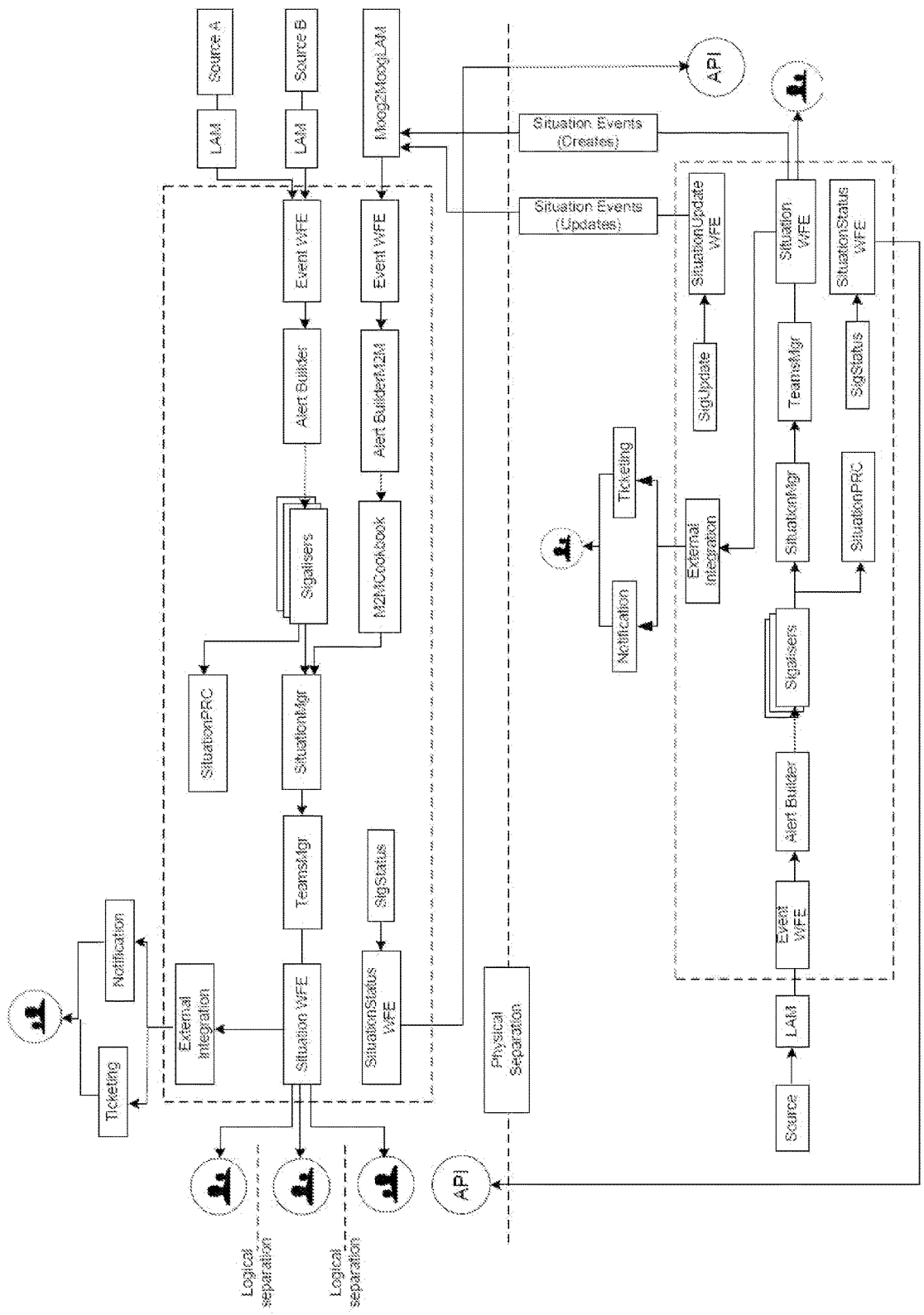
FIG. 26 illustrates one embodiment of lower tiers coupled to an upper tier.

Referring to FIG. 26, in one embodiment, system 10 provides separation and independent management, allowing for enabling multi-systems to interact with each other. Data separation and scale is provided. As a non-limiting example, system 10 allows for consolidation of information from a space with an aggregation of information from a lower tier level to a higher or a top tier level of information. Every layer of information recited above is a lower tier level. These lower tier layers of information can-not operate on their own. Each lower tier layer has a link to an upper or top tier level. As a non-limiting example, there can be a plurality or "n" layers of lower tiers that are coupled to the top tier level. Each lower tier layer is a discrete operational area. The top tier level has access to all lower layers. In one embodiment, entanglement is desired but the depth of entanglement is configurable. As a non-limiting example an object "A" in a lower tier level has an object "A" in the top tier level. An alteration of a lower tier level creates an alteration in a top tier level.

However, there is no-cross-lower tier level entanglement and modification. A lower tier level can modify things at the top tier level, but can-not change or modify other lower tier levels. A user of the top tier level can act on a lower tier level, and a user of a lower tier level can-not go across other lower tier levels to made alterations to other lower tier levels.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

In one embodiment a distributed system 10 includes a collection of autonomous computers linked by a Network System, such as a computer network, and equipped with distributed system software. This software enables managed devices 412 to coordinate their activities and to share the resources of the system hardware, software, and data. The distributed system provides a single, integrated computing facility even though it may be implemented by many computers in different locations.

In one embodiment the distributed system 10 includes collections of modules, each with its own specific function, interconnected to carry out integrated data acquisition and control.

Figure 27A:
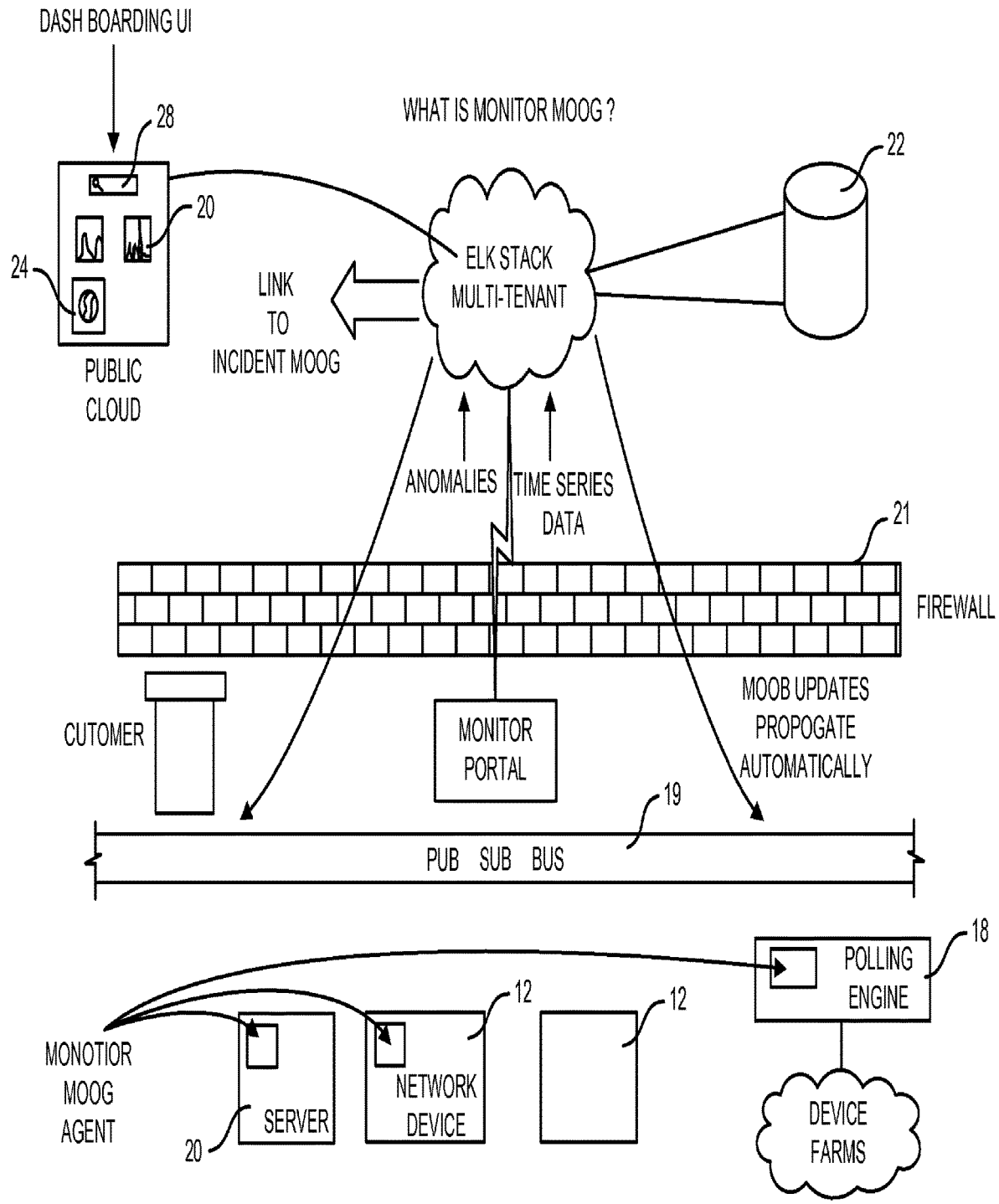
FIG. 27A illustrates one embodiment of a distributed system with a plurality of managed devices with monitoring system of the present invention.

FIG. 27A illustrates one embodiment of a distributed system 10 of the present invention of the managed devices 412. An agent 416 runs on the managed devices 412. In one embodiment one agent 46 is used. In another embodiment a plurality of agents 446 are used. The agent(s) 416 run on a dedicated polling server 418. All of the agents 46 communicated over a published subscribed bus 418. A monitor/Moob portal bridge 419 listens on the bus 418 which communicates through a client's firewall 421 to Network System, the internet, with software running in the cloud on a server 420. Server 420 has a database 422 of anomies, and time series data.

A search engine 424, which can be in the cloud, resides on top of the database 422. A web server 426 serves a user interface 428 that is used to search for anomies.

Polling is done by (i) embedded agent polling of the managed local device 412 devices that the agent 416 is running or (ii) across Network Systems 414 as a proxy agent 416.

In one embodiment a repository of moobs run on the server 418. The agent(s) 416 discover its local environment which and determines: (i) what managed device 412 it is running on; (ii) the things needing monitoring on the managed device 412; (iii) and another configuration information used to query via the portal bridge 419 to determine which moobs it needs to download and implement.

Figure 27B:
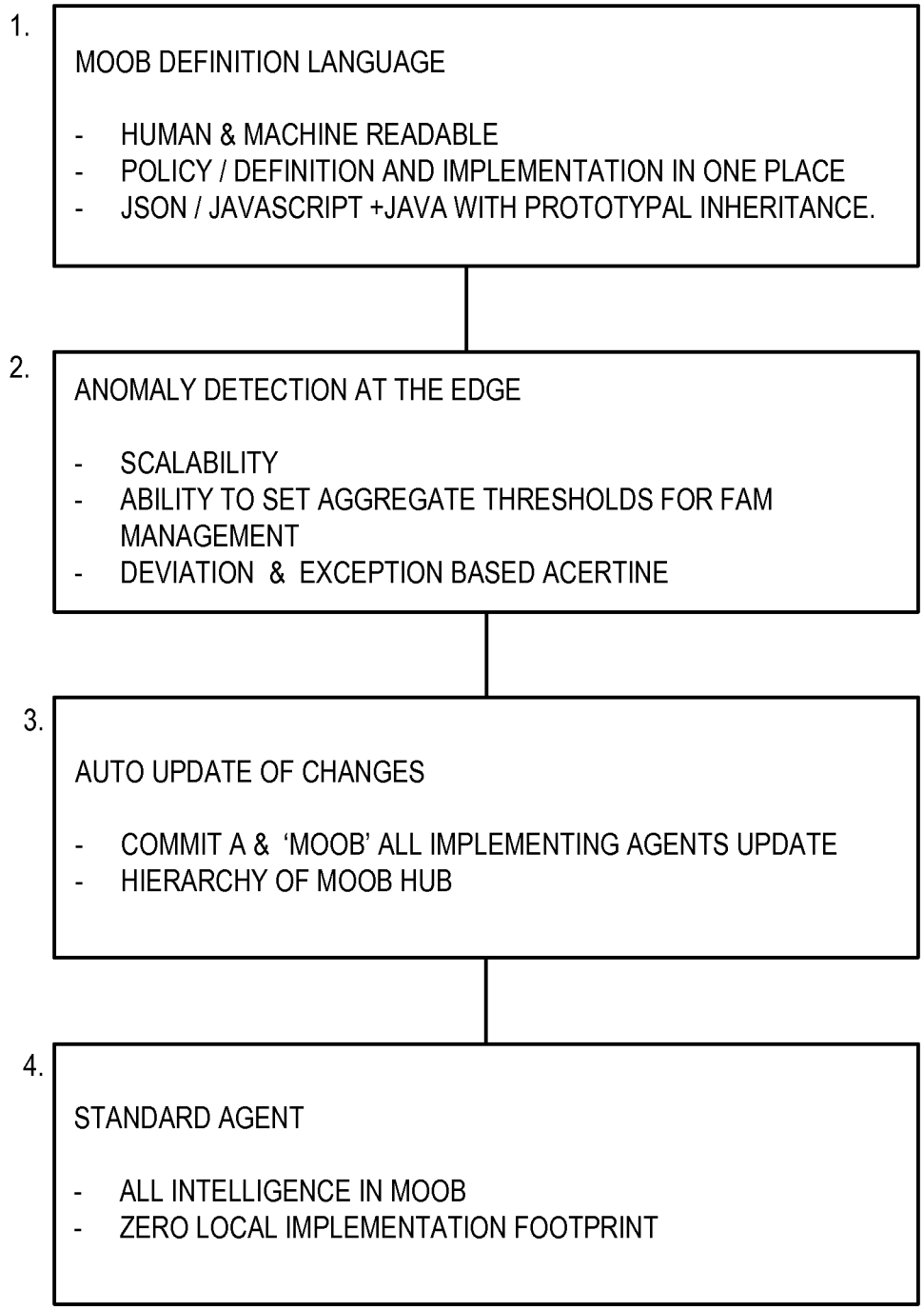
FIG. 27B illustrates one embodiment of the flow chart corresponding to the operations performed in FIG. 27A.

Going up through the portal bridge 419 is the time series data and the discovered anomalies. Going back down through the portal bridge 419 are any updates to moobs Referring now to the FIG. 27B flow chart, an agent starts thing up, discovers the local environment, and then communicates through the repository and retries moobs. The agent does poll and either communicates the time data series back, or detects an anomaly. For hole discovered it checks a value for an anomaly. Detected anomalies are communicated back. If an anomaly is not detected the agent sends a time series data point to the repository in the cloud. When there are changes in the moobs, the agent loads the change and restarts with the polling In one embodiment of the present invention distributed systems 10 are provided that improve monitoring and management for distributed systems.

In one embodiment of the present invention distributed systems 10 are provided with a single point of definition and control of management policy.

In one embodiment of the present invention distributed systems 10 are provided that make it easier to control consistently.

In one embodiment of the present invention distributed systems 10 are provided where management policy at the agent is automatically sent policy updates.

In one embodiment of the present invention distributed systems 10 are provided with management policies set in human readable and machine formats.

In one embodiment of the present invention distributed systems 10 are provided with a single agent.

In one embodiment of the present invention distributed systems 10 are provided that can install at the agent(s) updates and changes to all management policies.

In one embodiment of the present invention distributed systems 10 are provided where anomaly detection is performed at the agent and are reported centrally to provide scalability and reduce noise.

In one embodiment of the present invention distributed systems 10 are provided that use self-updating agents and analytics.

In one embodiment of the present invention distributed systems 10 are provided that enable executable agent definition language.

In one embodiment of the present invention distributed systems 10 are provided that enable executable agent definition language In one embodiment of the present invention distributed systems 10 are provided that embed one or more of management policies, monitored variable quantities, anomaly detection, and definitions of detected anomaly in agents coupled to the system.

In one embodiment of the present invention distributed systems 10 are provided that detect anomalies, executed by a distributed agent, which is distributed to monitored devices or dedicated agent execution computers, to provide for proxy monitoring.

In one embodiment of the present invention distributed systems 10 are provided for anomaly detection executed by a distributed agent which is distributed to monitored devices and is a generic agent.

In one embodiment of the present invention distributed systems 10 are provided for anomaly detection executed by a distributed agent is distributed to monitored devices and is a generic agent, where everything is defined from one or more Moob files.

In one embodiment of the present invention distributed systems 10 are provided for anomaly detection executed by a distributed agent is distributed to monitored device and is a generic agent that provides for Moob files and supporting resource files to be at every device.

In one embodiment of the present invention distributed systems 10 are provided for anomaly detection executed by a distributed agent, which self-updates, and is distributed to monitored devices.

In one embodiment of the present invention distributed systems 10 are provided to allow anomaly detection to be dependent upon the values of the same parameters across a plurality of monitored devices gathered by different agents.

With the present invention structured managed information writes and uses JSON, eliminating MIBs.

In one embodiment probability management policy is encoded in JSON. In one embodiment JSON is embedded with some Javascript code. With the present invention JSON becomes an object literal containing both data format definitions and active policy. This is termed a Moob.

In one embodiment a Moob includes a list of monitored system parameters (hereafter Moobels), including but not limited to system performance parameters, network availability tests, log messages and other sources of system health. The Moobles are provides with an "updater" method which references a Java script function. In one embodiment the Moob file is a defined Java script program file, and associated Java libraries necessary to implement the functionality in the "updater" method import different Moob, a list of individual parameters, values, that can be monitored that have relevance to the Moob file, a Mooble describes monitored system parameters who you monitor a parameter, each device has a plurality of Moobs, the generic agent knows which Moobs it needs to ask the central control point, the manager more, and then changes can be automatically sent out, the Mooble can define anomalies, delete the syntax, With the present invention analytics are run in the agent to implement flexible thresholds for anomaly detection. Base lining is part of that process.

All of the statistical analysis is done at the agent level.

In one embodiment of the present invention the manager, agent and the structure of managed information is integrated in one place as illustrated in FIG. 2. This definition of this behavior is placed in a JSON literal, which can make reference to Java libraries to imitate the behavior.

In one embodiment agents are embedded on a device to be managed or operate in a proxy manner. The agents communicate to a gateway using the public internet. Gateway queries from the management counsel which Moogs the agent should load and run.

The agent pulls from the gateway over a message bus the relevant and predefined Moog files, auxiliary Java script files, the Java libraries and the like.

When the moogs are centrally changed and/or updated, these changes and/or updates are propagated to all of the agents.

The functionally is supported in a moog that can obtain a value, set a value, run analytics on that value, report the value back, report exceptions, and the like.

At the management console it is reported to event management counsel as an event. If not, then the system stores the values in a searchable external document-oriented store.

The system provides a user interface to the data store to provide for flexible, search oriented dashboards. All anomalies are propagated to fault management systems such as Incident. A Moog is utilized that is a single point of definition and control of management policy, which makes it easier to control consistently With the present invention one or more of the following are achieved: management policy updates are automatically sent; management policy is sent in a in human readable and machine formats; a single agent can be used; hosting can be done at the agent level along with updating and changes of management policies anomaly detection is pushed out to the agent using to provide scalability and noise reduction In one embodiment a true or false determination is made and a moogles can return an arbitrary deeply nested object. As a non-limiting example, the system inspects the objects as being true or false, including the ability to apply a Boolean expression, against a collection of values, to determine a true or false. The system looks for a true or false of an object we look for true or false. In one embodiment true or false depends on the question being asked.

In one embodiment the events are converted into words and subsets to group the events into clusters that relate to security of the managed infrastructure. In response to grouping the events, physical changes are made to at least a portion of the physical hardware. In response to the production of the clusters security of the managed infrastructure is maintained.

In one embodiment security includes at least one of managed infrastructure: breach, intrusion or propagation. In one embodiment security includes managed infrastructure: access control, intrusion detection and threat propagation. As non-limiting examples security includes at least one of: authentication of a subject; authorization to the managed infrastructure of a subject; authorization that specifies what a subject can do relative to the managed infrastructure; audit; identification and authentication to ensure that only authorized subjects can access the managed infrastructure; and access approval grants to the managed infrastructure by association of users with resources that they are allowed to access, based on an authorization policy.

Figure 27C:
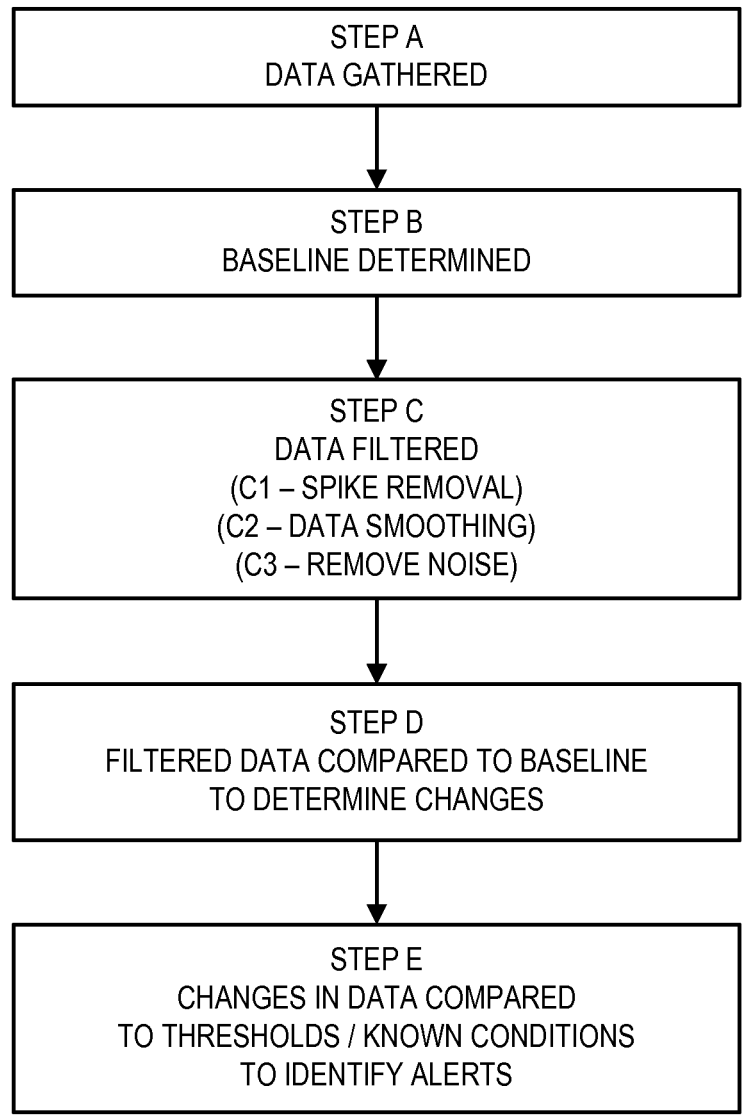
FIG. 27C is a flow chart of the basic step elements of a combined method of true/false determination in one embodiment of the present invention.
Figure 28:
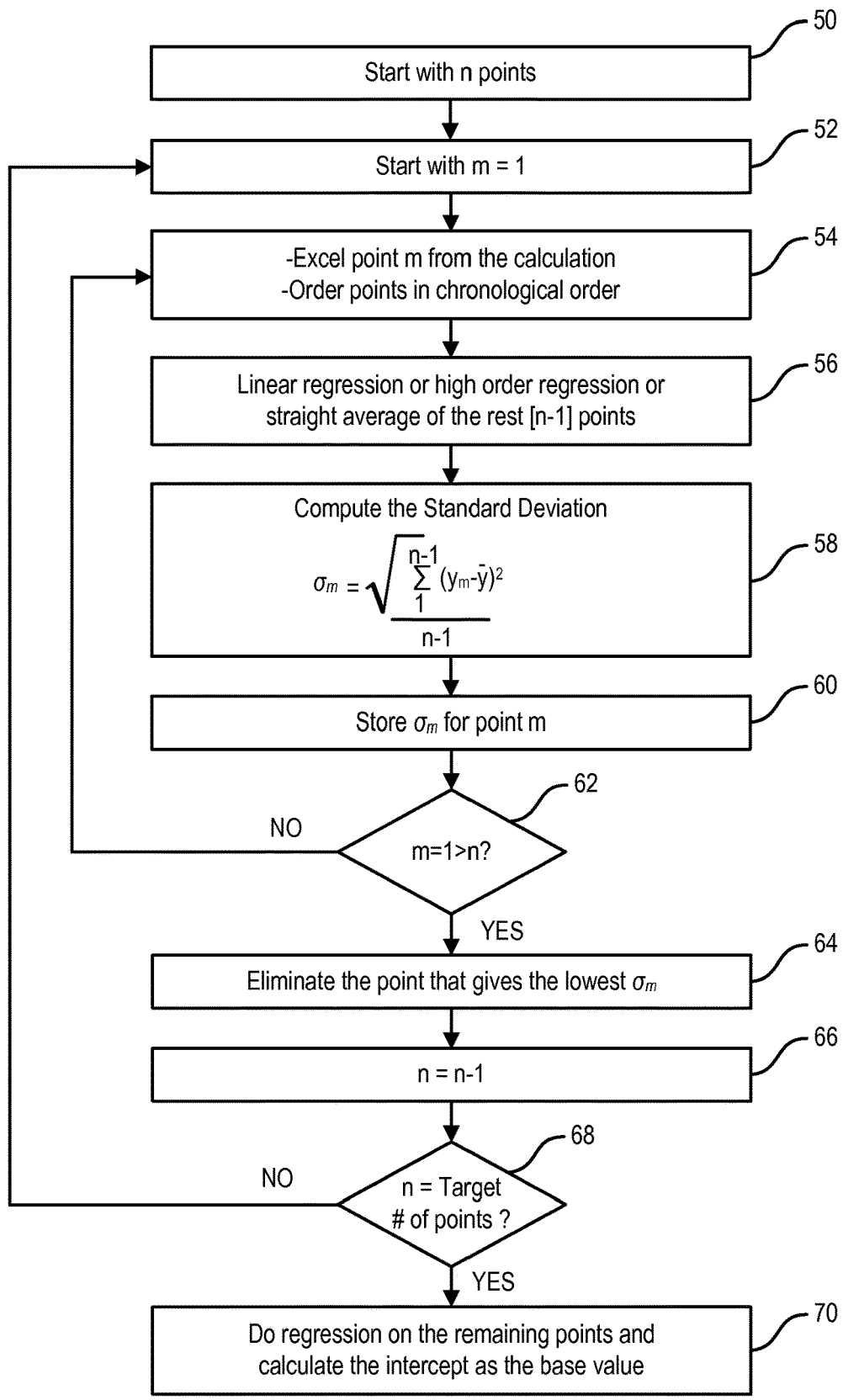
FIG. 28 is a flow chart of a baseline calculation process for use in the method of FIG. 27.

Referring to FIGS. 27 and 28, one method of the present invention uses true/false determination with a baseline calculation technique is performed to determine a baseline for each parameter in the monitoring and management of a distributed system 10.

In one embodiment of the present invention distributed systems 10 are provided with a single point of definition and control of management policy. In one embodiment the algorithm begins with the first n points in the data signal, and then discards x points to achieve the "target" number of best data points. As a non-limiting example, n can begin as n=15 and x=5 to arrive at 10 "good" data points to use in the baseline calculation. The recursive algorithm used is as follows: the first n data points (here, preferably 15) from the data signal are selected 450. An index m is set to "1" at step 452 and point m (which corresponds to the first data point of the data signal) is then temporarily ignored and a linear regression, high order regression or simple averaging is then performed on the remaining (n−1) points 456 in the n set. In one embodiment a linear regression is used. The standard deviation is then calculated 458 for the (n−1) points, as follows:

$$\sigma i = \Sigma 1 n - 1 (yi - y\_)2n - 1$$

wherein σi is the standard deviation and yi is the individual value of the (n−1) data points.

The standard deviation is stored 460 in correlation to the ignored mth data point, and the process is repeated 462 until m=n (i.e. when m=2, the second data point is temporarily ignored (hence the coined term "odd-man out") and the standard deviations of the other n−1 points are calculated, and the result stored corresponding to the second point, until each of these n points has an associated standard deviation calculated). The standard deviation values are then compared 464 and the point in the n set having the lowest standard deviation is removed 464 (since it is thus the greatest outlier). The counter n is then set 466 to n−1 to account for the discarded point and checked at 468 to determine whether the target number of points has been reached. If not, steps 452 to 468 are repeated, and the next point with the smallest odd-man out standard deviation is also discarded, and so on, until the target number of data points is reached. When n=the target number, a second linear regression is preferably done (could also be a simple average or higher-order regression) on the target (i.e. "good") points and the intercept (or average, as the case may be) is calculated 470 to yield the calculated baseline value for that parameter. A baseline is calculated for each parametric data to be analyzed.

Figure 29:
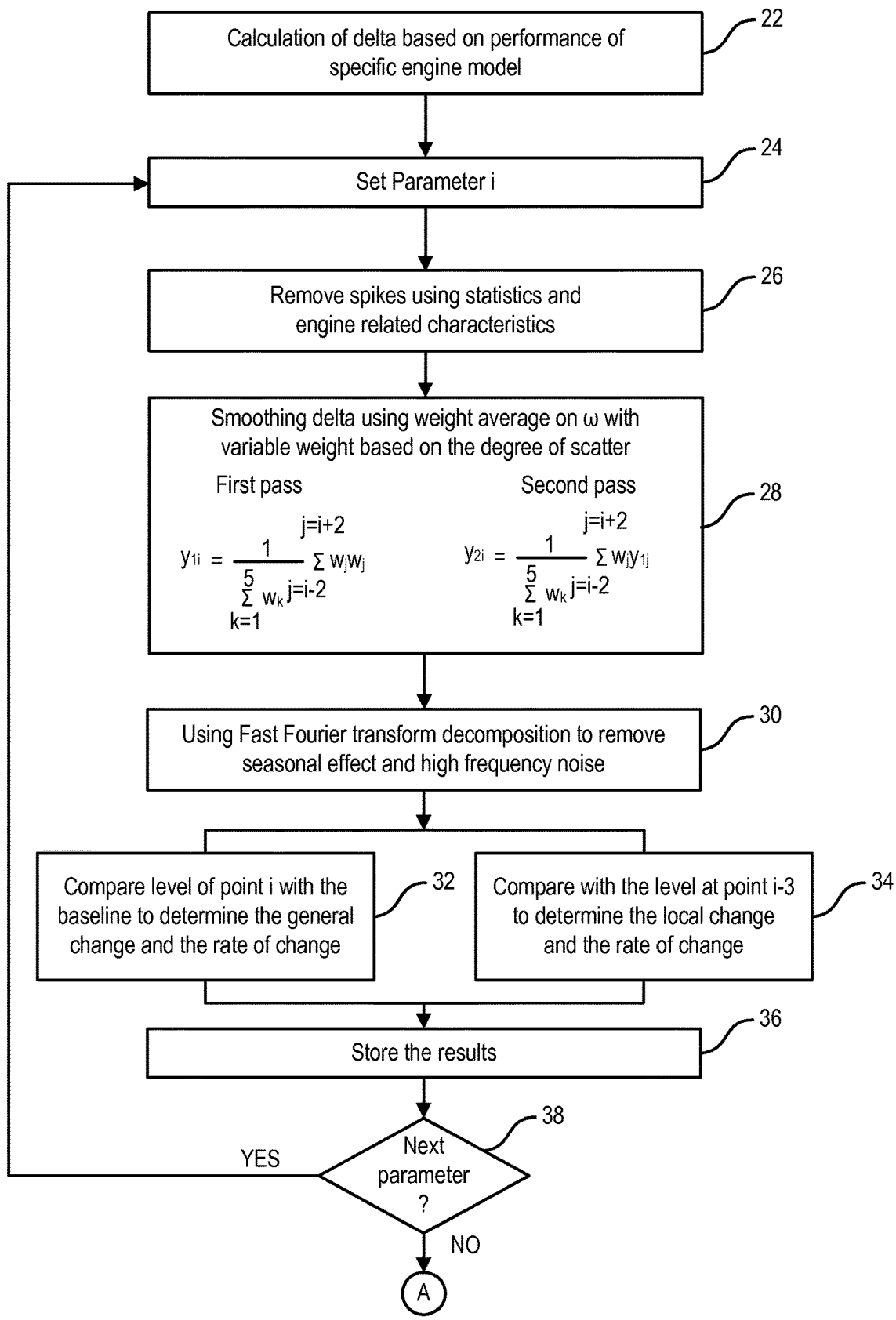
FIG. 29 is a flow chart of a data smoothing technique for use in the method of FIG. 27.

Referring now to FIGS. 27C and 29, one embodiment of data filtering uses a smoothing technique that involves the steps of spike removal, a low-point weight-averaging of the data and removing high frequency and low frequency noise, as will be each described in more detail below.

In the process depicted in FIG. 29, a counter or index is preferably used to facilitate automated execution of the calculations. Thus, an index or counter i is set and maintained 424 accordingly, the results of the steps following are stored 436 and the steps are repeated 438 until performed on each data point in the set, as desired.

As a first step, each data point is examined for local spikes which, if found, are then removed 426 from the delta. Any threshold or a statistical type approach (or other approach) may be used for spike removal. An example threshold approach is to pre-specify a threshold value. The threshold can be used to locate and remove the spikes by discarding any data point which exceeds the threshold.

In one embodiment the threshold can be obtained using a statistical approach that reflects the "scaftered-ness" of the data. (e.g. the threshold can be three times the standard deviation, and any points outside this range are considered spikes and discarded accordingly). In one embodiment an algorithm is utilized to determine and remove spikes is along the lines of the first concept above, as follows:

A data point is considered a spike and thus removed if: (1) It is higher or lower than both of two neighboring points (i.e. one on each side); and (2) Its absolute difference from the two neighboring points is greater than a predetermined threshold.

Referring still to FIGS. 27C and 29, once any spike has been corrected (as necessary), the data point is then preferably smoothed. As a non-limiting example smoothing is achieved using a weighted-average and regression technique, as follows.

First, a weighted-average value which takes into account data points (again, in this embodiment it is the delta data being analyzed) both before and after the current point, is evaluated recursively 428, as described below. The weight factor is preferably chosen to be small enough to retain the step changes and yet large enough to also smooth out the curve. As a non-limiting example, a low-point weighted average is effective in achieving these goals.

As a non-limiting example, a 5-point weighted average has been found to satisfactorily achieve this goal. The variable weight chosen is based on the degree of scatter in the data. The equation is adjusted accordingly for the first and last points.

In one embodiment the weighted-average calculation algorithm for the first pass of the smoothing is as follows:

$$y1i = 1\Sigma k = 15 wk \Sigma j = i-2 j = i+2 wj yj$$

where:
i is the parameter value that is being addressed,
j goes from i−2 to i+2 (in a five-point average),
wj is the weighting assigned for each j point in the calculation (here, for a 5-point average in gas turbine data analysis, weights of 0.1, 0.2, 0.4, 0.2 and 0.1 for each of j=i−2 to i+2 respectively, are preferred),
k goes from 1 to the number of points of the average (which is, again, in this case 5), and yj is the value of data point j.

After the first pass through the data is computed, a second pass is then performed and the algorithm can be used for a second pass of the smoothing is similar, as follows:

$$y2i = 1\Sigma k = 15 wk \Sigma j = i-2 j = i+2 wjy1j$$

where y1j is the corresponding weight-averaged value from the first pass, described above.

In one embodiment the data point is then further filtered to remove noise from the data. In particular the data is filtered to remove any low frequency noise (e.g. seasonal variation) to further locally smooth the curve. In one embodiment a standard Fast Fourier Transform (FFT) algorithm is used 30 to remove a certain number, as a non-limiting example can be two, of the lowest frequencies in the data.

In one embodiment once the filtered delta data is obtained, the global change and local change are determined 432 and 434. Preferably global change is determined by comparing 432 the data point i with its relative baseline value. The local change is preferably calculated using a simple derivative-type calculation, wherein the local change and local rate of change is determined by comparison of the value at the point with the value at a previous (i.e. in time) point or points.

In one embodiment, a point i is compared with a previous point outside the original n-point weighted average smoothing calculation (described above) to prevent neighboring points from directly affecting each other in this averaging process. Here, because a 5-point average was used above in this example, the point i is compared 434 the point i−3 (i.e. third previous point) to calculate the local change and rate of change. Once filtering and the corresponding change and rate of change information has been computed, all results are preferably stored 436 for use in the alert identification process, described below.

As mentioned above, the steps 424 to 436 are performed for each parameter of the data until all data signals have been processed 438. The processing may be executed sequentially or in parallel.

Referring now to FIGS. 27C and 30, the next step is to review the data and mark alert conditions. A multiple parameter analysis can be performed.

Briefly a predetermined "acceptable" threshold value as a comparator can be used for each parameter, which may be either generic or data specific. An alert is thus generated preferably based on an analysis of (a) the global change (i.e. the difference between the base value and the smoothed value), and/or (b) the local change (i.e. difference between the smoothed value and a previous smoothed value), the calculation of both of which are described above. From the results of (a) and (b) the alert can be marked and classified as a "step" change or "gradual" change. (It will be understood that a "step" change is one in which there is an instantaneous change in the data over very few successive data points, whereas a "gradual" change is a change which occurs (often in a drifting fashion) usually over many successive data points). The problems may then be determined by an analysis of the changes and/or by a comparison of the combined true/false for all parameters with a knowledge base (preferably computerized) containing known engine conditions or problems. For example, in the described embodiment, if the combined true/false of (a) ITT is gradually up, (b) NH is gradually down, (c) NL is gradually up and (d) Wf is gradually up.

As a non-limiting example, the analysis process can be executed in an algorithm of FIG. 4 as follows:

A change from the baseline is identified 480 for each parameter of a series of n parameters, preferably through the process shown in FIG. 3, i.e. by comparing a data point of interest (e.g. the last data point in the data stream) to the baseline. The "change status" is the value (i.e. magnitude) of the change in the parametric data. The "change set" is the set of change statuses identified 480 for all n parameters analyzed. There is a total of n3 change sets possible in a typical case, since a change status would typically be measured as either (1) an increase (between baseline and the examined data point), (2) a decrease or (3) status quo. Therefore, the particular change set identified at 480 is then matched 482 to one of the possible n3 change sets. Using an appropriate knowledge base, which can be a computer database with acquired data and considered "typical" and/or "desirable", the matched state is then correlated 484 to stored typical characteristics.

In the event that a possible "problem" is identified through the comparison with the knowledge base, a possible problem identification code is determined or selected 486 by or from the knowledge base. An alert message is then generated 488. The alert message can be sent 490. The alert message may be recorded for later retrieval and viewing.

Cloud Infrastructure

Figures #represent a logical diagram of a Cloud Infrastructure in accordance with the present invention. As shown, the Cloud encompasses web applications, mobile devices, personal computer and/or laptops and social networks, such as, Twitter®. ("Twitter®" is a trademark of Twitter Inc.). It will be appreciated that other social networks can be included in the cloud and Twitter® has been given as a specific example. Therefore, every component forms part of the cloud which comprises servers, applications and clients as defined above.

The cloud-based system facilitates adjusting utilization and/or allocation of hardware resource(s) to remote clients. The system includes a third-party service provider, that is provided by the methods used with the present invention, that can concurrently service requests from several clients without user perception of degraded computing performance as compared to conventional techniques where computational tasks can be performed upon a client or a server within a proprietary intranet. The third-party service provider (e.g., "cloud") supports a collection of hardware and/or software resources. The hardware and/or software resources can be maintained by an off-premises party, and the resources can be accessed and utilized by identified users over Network System. Resources provided by the third-party service provider can be centrally located and/or distributed at various geographic locations. For example, the third-party service provider can include any number of data center machines that provide resources. The data center machines can be utilized for storing/retrieving data, effectuating computational tasks, rendering graphical outputs, routing data, and so forth.

According to an illustration, the third-party service provider can provide any number of resources such as data storage services, computational services, word processing services, electronic mail services, presentation services, spreadsheet services, gaming services, web syndication services (e.g., subscribing to an RSS feed), and any other services or applications that are conventionally associated with personal computers and/or local servers. Further, utilization of any number of third-party service providers similar to the third-party service provider is contemplated. According to an illustration, disparate third-party service providers can be maintained by differing off-premise parties and a user can employ, concurrently, at different times, and the like, all or a subset of the third-party service providers.

By leveraging resources supported by the third-party service provider, limitations commonly encountered with respect to hardware associated with clients and servers within proprietary intranets can be mitigated. Off-premises parties, instead of users of clients or Network System administrators of servers within proprietary intranets, can maintain, troubleshoot, replace and update the hardware resources. Further, for example, lengthy downtimes can be mitigated by the third-party service provider utilizing redundant resources; thus, if a subset of the resources are being updated or replaced, the remainder of the resources can be utilized to service requests from users. According to this example, the resources can be modular in nature, and thus, resources can be added, removed, tested, modified, etc. while the remainder of the resources can support servicing user requests. Moreover, hardware resources supported by the third-party service provider can encounter fewer constraints with respect to storage, processing power, security, bandwidth, redundancy, graphical display rendering capabilities, etc. as compared to conventional hardware associated with clients and servers within proprietary intranets.

Resources can be shared amongst a plurality of client devices subscribing to the third-party service provider. According to an illustration, one of the resources can be at least one central processing unit (CPU), where CPU cycles can be employed to effectuate computational tasks requested by the client device. Pursuant to this illustration, the client device can be allocated a subset of an overall total number of CPU cycles, while the remainder of the CPU cycles can be allocated to disparate client device(s). Additionally, or alternatively, the subset of the overall total number of CPU cycles allocated to the client device can vary over time. Further, a number of CPU cycles can be purchased by the user of the client device. In accordance with another example, the resources can include data store(s) that can be employed by the client device to retain data. The user employing the client device can have access to a portion of the data store(s) supported by the third-party service provider, while access can be denied to remaining portions of the data store(s) (e.g., the data store(s) can selectively mask memory based upon user/device identity, permissions, and the like). It is contemplated that any additional types of resources can likewise be shared.

The third-party service provider can further include an interface component that can receive input(s) from the client device and/or enable transferring a response to such input(s) to the client device (as well as perform similar communications with any disparate client devices). According to an example, the input(s) can be request(s), data, executable program(s), etc. For instance, request(s) from the client device can relate to effectuating a computational task, storing/retrieving data, rendering a user interface, and the like via employing one or more resources. Further, the interface component can obtain and/or transmit data over a Network System connection. According to an illustration, executable code can be received and/or sent by the interface component over the Network System connection. Pursuant to another example, a user (e.g. employing the client device) can issue commands via the interface component.

In one embodiment, the third-party service provider includes a dynamic allocation component that apportions resources, which as a non-limiting example can be hardware resources supported by the third-party service provider to process and respond to the input(s) (e.g., request(s), data, executable program(s), and the like, obtained from the client device.

Although the interface component is depicted as being separate from the dynamic allocation component, it is contemplated that the dynamic allocation component can include the interface component or a portion thereof. The interface component can provide various adaptors, connectors, channels, communication paths, etc. to enable interaction with the dynamic allocation component.

In one embodiment a system includes the third-party service provider that supports any number of resources (e.g., hardware, software, and firmware) that can be employed by the client device and/or disparate client device(s) not shown. The third-party service provider further comprises the interface component that receives resource utilization requests, including but not limited to requests to effectuate operations utilizing resources supported by the third-party service provider from the client device and the dynamic allocation component that partitions resources, including but not limited to, between users, devices, computational tasks, and the like. Moreover, the dynamic allocation component can further include a user state evaluator, an enhancement component and an auction component.

The user state evaluator can determine a state associated with a user and/or the client device employed by the user, where the state can relate to a set of properties. For instance, the user state evaluator can analyze explicit and/or implicit information obtained from the client device (e.g., via the interface component) and/or retrieved from memory associated with the third-party service provider (e.g., preferences indicated in subscription data). State related data yielded by the user state evaluator can be utilized by the dynamic allocation component to tailor the apportionment of resources.

In one embodiment, the user state evaluator can consider characteristics of the client device, which can be used to apportion resources by the dynamic allocation component.

For instance, the user state evaluator can identify that the client device is a mobile device with limited display area. Thus, the dynamic allocation component can employ this information to reduce resources utilized to render an image upon the client device since the cellular telephone may be unable to display a rich graphical user interface.

Moreover, the enhancement component can facilitate increasing an allocation of resources for a particular user and/or client device.

In one embodiment a system employs load balancing to optimize utilization of resources. The system includes the third-party service provider that communicates with the client device (and/or any disparate client device(s) and/or disparate third-party service provider(s)). The third-party service provider can include the interface component that transmits and/or receives data from the client device and the dynamic allocation component that allots resources. The dynamic allocation component can further comprise a load balancing component that optimizes utilization of resources.

In one embodiment, the load balancing component can monitor resources of the third-party service provider to detect failures. If a subset of the resources fails, the load balancing component can continue to optimize the remaining resources. Thus, if a portion of the total number of processors fails, the load balancing component can enable redistributing cycles associated with the non-failing processors.

In one embodiment a system archives and/or analyzes data utilizing the third-party service provider. The third-party service provider can include the interface component that enables communicating with the client device. Further, the third-party service provider comprises the dynamic allocation component that can apportion data retention resources, for example. Moreover, the third-party service provider can include an archive component and any number of data store(s). Access to and/or utilization of the archive component and/or the data store(s) by the client device (and/or any disparate client device(s)) can be controlled by the dynamic allocation component. The data store(s) can be centrally located and/or positioned at differing geographic locations. Further, the archive component can include a management component, a versioning component, a security component, a permission component, an aggregation component, and/or a restoration component.

The data store(s) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store(s) of the subject systems and methods is intended to comprise, without being limited to, these and any other suitable types of memory. In addition, it is to be appreciated that the data store(s) can be a server, a database, a hard drive, and the like.

The management component facilitates administering data retained in the data store(s). The management component can enable providing multi-tiered storage within the data store(s), for example. According to this example, unused data can be aged-out to slower disks and important data used more frequently can be moved to faster disks; however, the claimed subject matter is not so limited. Further, the management component can be utilized (e.g. by the client device) to organize, annotate, and otherwise reference content without making it local to the client device. Pursuant to an illustration, enormous video files can be tagged via utilizing a cell phone. Moreover, the management component enables the client device to bind metadata, which can be local to the client device, to file streams (e.g., retained in the data store(s)); the management component can enforce and maintain these bindings.

Additionally, or alternatively, the management component can allow for sharing data retained in the data store(s) with disparate users and/or client devices. For example, fine-grained sharing can be supported by the management component.

The versioning component can enable retaining and/or tracking versions of data. For instance, the versioning component can identify a latest version of a document (regardless of a saved location within data store(s)).

The security component limits availability of resources based on user identity and/or authorization level. For instance, the security component can encrypt data transferred to the client device and/or decrypt data obtained from the client device. Moreover, the security component can certify and/or authenticate data retained by the archive component.

The permission component can enable a user to assign arbitrary access permissions to various users, groups of users and/or all users.

Further, the aggregation component assembles and/or analyzes collections of data. The aggregation component can seamlessly incorporate third party data into a particular user's data.

The restoration component rolls back data retained by the archive component. For example, the restoration component can continuously record an environment associated with the third-party service provider. Further, the restoration component can playback the recording.

In one embodiment of the present invention, on computer networks, unique tokens that represent state changes are typically scarce. Many tokens are duplicates or slight variations of each other. As a non-limiting example, language models can learn these tokens and their contexts. This can be used to classify or group together state changes on a network. However, a large volume of data, sequences of tokens. is typically required to provide enough context and learn the semantic and syntactic characteristics of tokens.

Unique tokens are typically to be spread uniformly through the corpus prior to any processing. In one embodiment, logic is provided to rearrange the ordering of sequences in the corpus such that all of the unique tokens are completely introduced by a subset of the entire corpus. As a non-limiting example, this requires ranking sentences in terms of frequency of unique tokens and ordering sentences such that they only introduce unseen unique tokens and not duplicates of tokens that have already been seen in the reordered corpus.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface/body motion, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

The invention claimed is:

1. A distributed system for managing a managed infrastructure with a plurality of devices, comprising:
   an extraction engine in communication with an a managed infrastructure, the extraction engine in operation receiving messages from the managed infrastructure and produces events that relate to the managed infrastructure and converts the events into words and subsets used to group the events into clusters that relate to failures or errors in the managed infrastructure, including managed infrastructure physical hardware, the managed infrastructure supporting the flow and processing of information;
   a sigalizer engine that includes one or more of an NMF engine, a k-means clustering engine and a topology proximity engine, the sigalizer engine determining one or more common steps from events and produces clusters relating to events, the sigalizer engine determining one or more common characteristics of events and producing clusters of events relating to the failure or errors in the managed infrastructure, where membership in a cluster indicates a common factor of the events that is a failure or an actionable problem in the physical hardware managed infrastructure directed to supporting the flow and processing of information; and
   a plurality of autonomous computers linked by a computer network, and equipped with distributed system software.

2. The system of claim 1, wherein the distributed system enables managed devices to coordinate their activities and share resources of a system hardware.

3. The system of claim 1, wherein the distributed system provides a single, integrated computing facility.

4. The system of claim 1, wherein the distributed system includes collections of modules, each with its own specific function, interconnected to carry out integrated data acquisition and control.

5. The system of claim 1, wherein an agent runs on the managed devices.

6. The system of claim 1, wherein the events are converted into words and subsets used to group the events into clusters that relate to failures or errors in the managed infrastructure.

7. The system of claim 1, wherein the at least one extraction engine includes one or more of a Non-negative Matrix Factorization NMF engine, a k-means clustering engine and a topology proximity engine.

8. The system of claim 1, wherein the at least one extraction engine is configured to determine one or more common characteristics of events and produces clusters relating to events.

9. The system of claim 1, wherein the at least one extraction engine includes first, second and third engines.

10. The system of claim 9, wherein the third engine assigns a graph coordinate to the event.

11. The system of claim 1, wherein an optional subset of attributes is extracted for each event and turned into a vector.

12. The system of claim 10, wherein the third engine inputs a list of devices and a list a connection between components or nodes in the managed infrastructure.

13. The system of claim 1, wherein the at least one extraction engine includes or is coupled to a k-means clustering engine that user graph coordinates to generate one or more clusters that brings together events with similar characteristics.

14. The system of claim 1, wherein the at least one extraction engine includes or is coupled to an NMF engine that first extracts clusters that have greater importance.

15. The system of claim 1, wherein the clusters are assigned a start and an end time.

16. The system of claim 1, wherein the managed infrastructure is from a business organization.

17. The system of claim 1, wherein the managed infrastructure includes, computers, network devices, appliances, mobile devices, text or numerical values from which those text or numerical values indicate a state of any hardware or software component of the managed infrastructure.

18. The system of claim 1, wherein the managed infrastructure generates data that include attributes selected from at least one of, time, source a description of the event, textural or numerical values from which those text or numerical values indicate a state of any hardware or software component of the managed infrastructure.

19. The system of claim 1, wherein the bus is a publication message bus.

20. The system of claim 1, further comprising: a data bus web server coupled to one or more user interfaces.

21. The system of claim 1, wherein a plurality of link access modules are in communication with the bus.

22. The system of claim 1, further comprising: a database.

23. The system of claim 1, wherein the reformatted data is received at the bus.

24. The system of claim 1, wherein a dictionary is generated with word and subtexts using Shannon Entropy, $-\ln(1/NGen)$ and normalizes the words and subtexts.

25. The system of claim 24, wherein normalized words and subtexts are mapped from a common 0.0 to a non-common 1.0.

26. The system of claim 1, further comprising:
an entropy database that in operation normalizes entropy for events.

27. The system of claim 26, wherein normalized entropy for events is mapped to a common, 0.0 and a non-common, 1.0.

28. The system of claim 1, wherein entropy is assigned to the alerts.

29. The system of claim 1, wherein the alerts are run in parallel with activities of the at least one extraction engine.

30. The system of claim 1, wherein the alerts are passed to the at least one engine.

* * * * *